United States Patent [19]
Diamond

[11] 3,903,134
[45] Sept. 2, 1975

[54] PHENYL PROPIONIC ACIDS AND DERIVATIVES THEREOF

[75] Inventor: Julius Diamond, Lafayette Hills, Pa.

[73] Assignee: William H. Rorer, Inc., Fort Washington, Pa.

[22] Filed: July 12, 1973

[21] Appl. No.: 378,740

Related U.S. Application Data

[62] Division of Ser. No. 164,822, July 21, 1971, abandoned.

[52] U.S. Cl.......... 260/476 R; 260/268 R; 260/284; 260/293.82; 260/295 S; 260/307 C; 260/348 A; 260/448 R; 260/455 R; 260/456 P; 260/459; 260/463; 260/465 D; 260/469; 260/470; 260/471 R; 260/473 R; 260/473 A; 260/475 R; 260/482 C; 260/485 H; 260/485 J; 260/485 L; 260/488 CD; 260/477; 260/501.16; 260/515 R; 260/515 A

[51] Int. Cl.² .......................................... C07C 69/78
[58] Field of Search..... 260/476, 473 A, 477, 448 R

[56] References Cited
FOREIGN PATENTS OR APPLICATIONS
1,952,360   6/1970   Germany .......................... 260/473 A OTHER PUBLICATIONS
Chemical Abstracts, Vol. 75, 5521d, (1971).
Chemical Abstracts, Vol. 72, 89980b, (1970).
Chemical Abstracts, Vol. 76, 21187a, (1972).

Primary Examiner—Lorraine A. Weinberger
Assistant Examiner—E. Jane Skelly
Attorney, Agent, or Firm—Erich M. H. Radde

[57] ABSTRACT

Novel β-(3-chloro-4-cyclohexylphenyl)-α-benzoyloxy propionic acid and its esters and salts are described.

2 Claims, No Drawings

PHENYL PROPIONIC ACIDS AND DERIVATIVES THEREOF

This is a division, of application Ser. No. 164,822, filed July 21, 1971, now abandoned.

SUMMARY OF THE INVENTION

This invention describes novel α-substituted p-cycloalkylphenyl-propionic acids and their derivatives and their use in therapeutic compositions. In addition, this invention relates to the preparation of α-substituted p-cycloalkylphenylpropionic acids. When the compounds of this invention are administered to mammals, they afford significant treatment of inflammation and associated pain and fever.

They further provide analgesic and antipyretic methods for the relief and treatment of pain and fever associated with inflammation.

BACKGROUND OF THE INVENTION

There has been continued efforts in research to develop drugs which would significantly inhibit the development of inflammation and relieve the pain and fever associated with it. Much of these efforts have been carried on in the field of steroids. While many of these compounds have been effective, they have had the drawback of causing many side effects.

I have unexpectedly found that α-mercapto-p-cycloalkylphenyl-propionic acid compounds and their derivatives have valuable pharmacologic properties.

I have found that α-mercapto-p-cycloalkylphenylpropionic acid compounds and their derivatives possess useful anti-inflammatory, analgesic and anti-pyretic properties.

I have also found a series of anti-inflammatory compounds which are non-steroidal.

I have further found that these α-mercapto-p-cycloalkylphenyl-propionic acid compounds and their derivatives are novel.

I have also found that the compounds of this invention are useful in effectively providing a method for the inhibition of inflammation and the treatment of associated pain and fever.

I have still further found an entirely new class of anti-inflammatory, analgesic and antipyretic pharmaceutical compositions containing the α-mercapto-p-cycloalkylphenylpropionic acids and derivatives of this invention as active ingredient.

I have again found a convenient method for synthesizing these compounds.

DESCRIPTION AND PREFERRED EMBODIMENT

This invention comprises a class of novel chemical compounds which contain a cycloalkyl substituted phenyl radical which is attached to an α-mercapto propionic acid in the β-position. This invention further comprises derivatives of said propionic acids and the method of preparing the same.

This invention also describes a new method of treating inflammation and associated pain and fever as well as novel therapeutic compositions.

The compounds of this invention can be represented by the generic structure which is described by the general formula I.

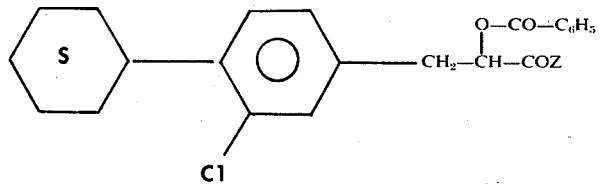

in which
Z is hydroxyl,
 lower alkoxy,
 phenyl lower alkoxy, or
 the group —OM in which M is an
  alkali metal, alkaline earth
  metal, aluminum, ammonium,
  or di-lower alkyl ammonium.

The compounds of this invention contain asymmetric carbon atoms in the alpha-position of the acid side chain. As a result, the above compounds of formula I may be obtained as racemic mixtures of their dextro (+) and levorotatory (−) isomers. It is to be understood that said d and l isomers as well as the dl mixtures thereof are embraced within the scope of this invention.

In the descriptive portions of this invention, the following definitions apply:

The term "lower alkyl" refers to a lower alkyl hydrocarbon group containing from 1 to about 6 carbon atoms which may be straight chained or branched.

"Lower alkoxy" signifies an alkoxy group containing from 1 to about 6 carbon atoms which may be straight chained or branched.

The preferred "alkali" or "alkaline earth" metals are sodium, potassium, calcium and magnesium.

The term "ammonium salt" refers to the cation formed when ammonia or an organic amine react with the carboxyl group to form ammonium salts of the structure driven in the formula. The ammonium salts are formed with a (1) loweralkylamines such as methylamine, diethylamine, triethylamine ; (2) hydroxyloweralkylamines such as β-hydroxyethylamine; (3) heterocyclic amines such as 2-aminopyridine, piperazine; piperidine, (4) aralkylamines such as α-methylbenzylamine, phenethylamine; (5) cycloalkylamines such as cyclohexylamine; (6) alkaloids such as quinine, cinchonidine, cinchonine, ephedrine.

A representatives compound of this invention is: α-benzoyloxy -β-(3-chloro-4-cyclohexylphenyl)propionic acid The compounds of this invention may be prepared from known starting materials. p-Cycloalkylbenzaldehyde may be (a) halogenated or (b) nitrated to obtain a corresponding 3-halo-4-cycloalkylbenzaldehyde or a 3-nitro-4-cycloalkylbenzaldehyde. Chlorination or bromination may be carried out in the presence of a small amount of iodine dissolved in an inert solvent such as carbon tetrachloride. A solution of chlorine or bromine is then added while the temperature is held near 0°C.

itration is carried out with fuming nitric acid at about °C. The following reaction equation illustrates this method.

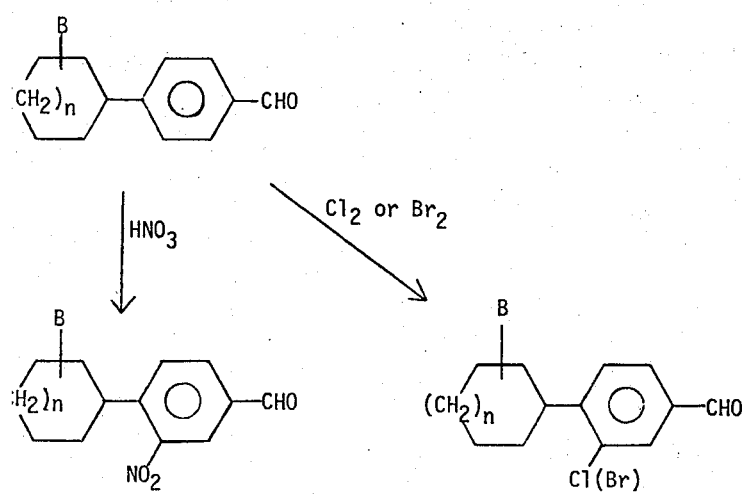

Claisen condensation of a p-cycloalkyl substituted ɛnzaldehyde with an acetic acid ester (preferably the weralkyl or benzyl ester) in the presence of a metal koxide results in a β-(p-cycloalkyphenyl) acrylic ester. The aldehyde may also be subjected to a Perkin re:tion with acetic anhydride and an acetic acid salt or rough a Knoevenogel condensation using malonic :id and ammonia in an amine base to obtain a β-(p-cycloalkylphenyl)acrylic acid. Addition to the double bond with chlorine or bromine results in a p-cycloalkylphenyl-α,β-dihalopropionic acid or ester. Alkali hydrolysis of the dihalide results in the β-(p-cycloalkylphenyl) pyruvic acid or ester which on hydrogenation in the presence of platinum oxide catalyst yields the desired lactic acid or ester. This hydrogenation may also be accomplished by selective reduction with sodium borohydride when catalytic hydrogenation is impractical because of the presence of a sensitive nitro group.

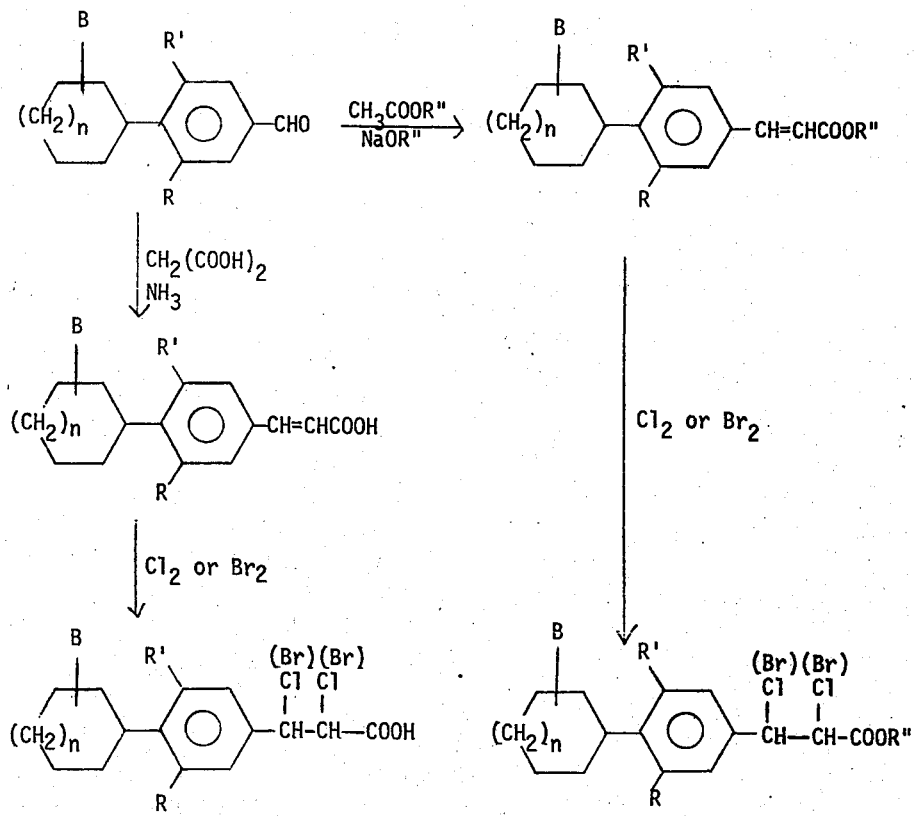

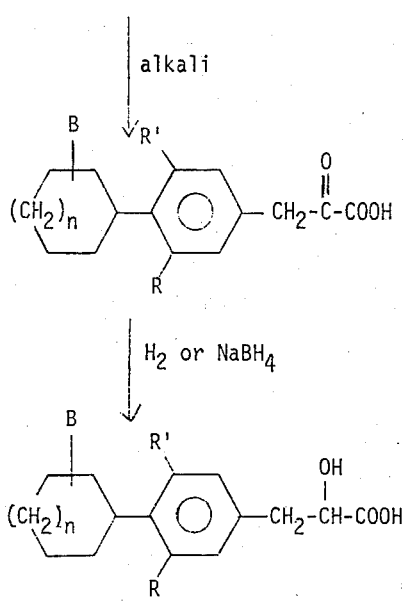
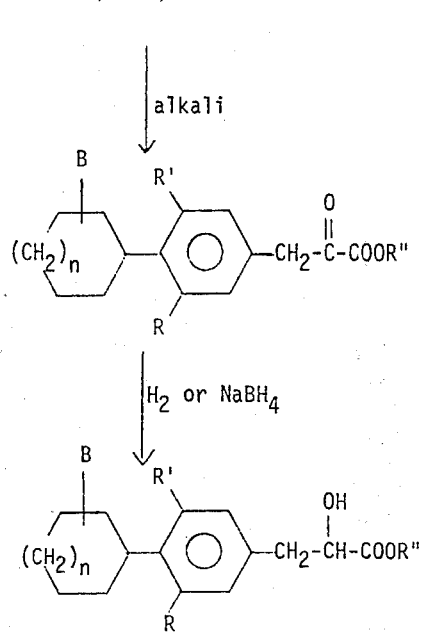

where R'' is loweralkyl or benzyl.

A substituted p-cycloalkylbenzaldehyde may also be condensed with hippuric acid in the presence of sodium acetate and acetic anhydride according to the method of Cavalline and Massarani as outlined in their Italian Patent No. 611,973 (1960): [Chem. Abstracts 55,19868g]. This condensation results in a 2-phenyl-4-(p-cycloalkyl)-5-oxazolone which on basic hydrolysis results in the β-(p-cycloalkylphenyl)pyruvic acid. This may then be reduced or treated with a Grignard reagent as above to the corresponding lactic acid.

The β-(p-cycloalkylphenyl)pyruvate ester is converted to the corresponding β-(p-cycloalkylphenyl)lactate ester by hydrogenation in the presence of platinum oxide. In the special case when R and R' is a substituent sensitive to catalytic hydrogenation, e.g., when R or R' is $NO_2$, SH, SR, SOR, I, etc., a selective reduction of the keto function is effected with sodium borohydride to give the β-(p-cycloalkylphenyl) lactate ester. The lactate esters are hydrolyzed with an aqueous alcoholic alkali hydroxide mixture to the corresponding β-(p-cycloalkylphenyl) lactic acid.

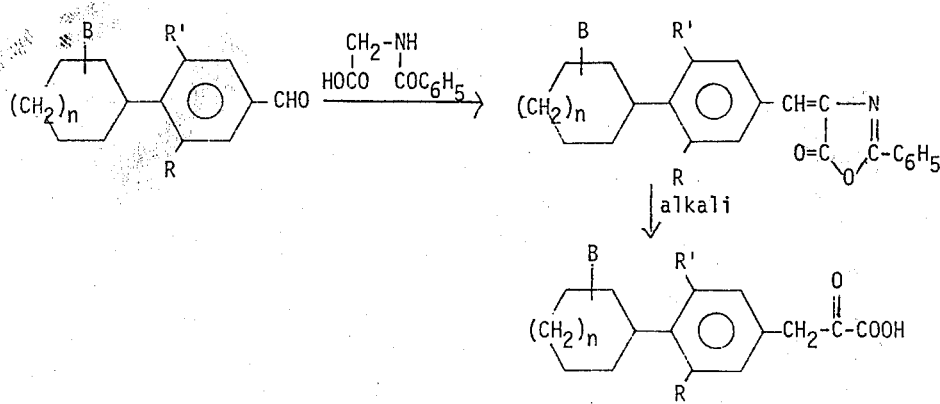

Other reactions can be carried on in a similar manner to obtain the desired substituent.

β-(p-cycloalkylphenyl)pyruvates react with aqueous-alcoholic alkali hydroxide or alkali carbonate to give the corresponding β-(p-cycloalkylphenyl)pyruvic acid.

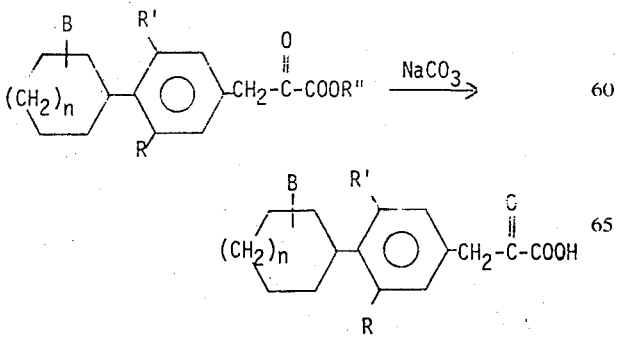

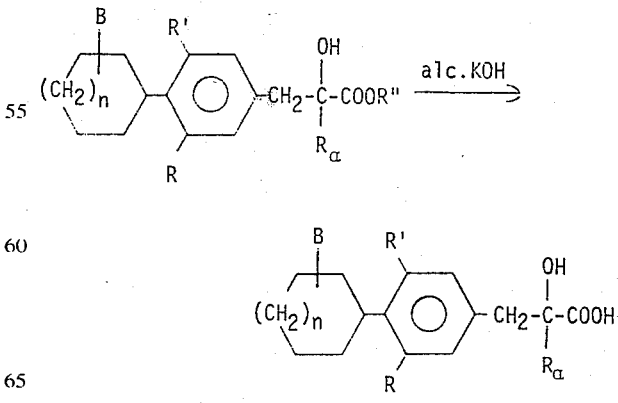

Catalytic hydrogenation of a β-(p-cycloalkylphenyl)-lactate benzyl ester over palladium results in the reduction of the keto group and hydrogenolysis of the benzyl group to give a β-(p-cycloalkylphenyl) lactic acid.

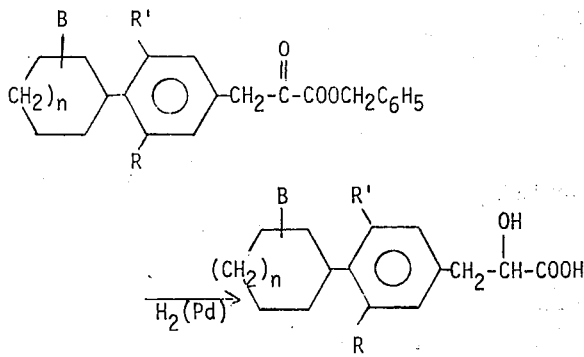

This invention further describes the acid addition salts formed by the action of one equivalent of a suitable base with the β-(p-cycloalkylphenyl)lactic acid. Suitable bases thus include for example the alkali metal alkoxides such as sodium methoxide, etc., and the alkali metal and alkaline earth metal hydroxides, carbonates, bicarbonates, etc. (such as sodium hydroxide, potassium hydroxide, calcium hyroxide, potassium carbonate, sodium bicarbonate, magnesium bicarbonate, etc.). Also, the aluminum salts of the instant products may be obtained by treating the corresponding sodium salt with an appropriate aluminum complex such as aluminum hydroxy chloride hexahydrate, etc. The ammonium salts may be made by reaction with the correponding amine such as methylamine, diethylamine, 1-hydroxyethylamine, piperazine, piperidine, α-methylbenzylamine, cyclohexylamine, triethylamine, phenethylamine, etc. The acid addition salts thus obtained are the functional equivalent of the corresponding β-(p-cycloalkylphenyl)lactic acid products and one skilled in the art will appreciate that to the extent that the instant acids are useful in therapy, the variety of acid addition salts embraced by this invention are limited only by the criterion that the bases employed in forming the therapeutically useful salts be both nontoxic and physiologically acceptable. The alkaloidal salts are useful for effecting optical resolutions.

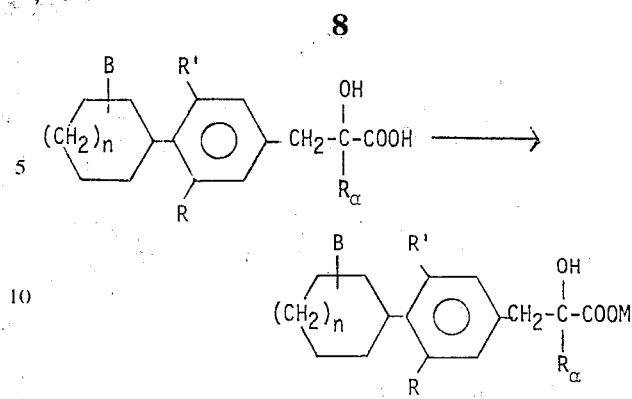

The β-(3-chloro-4-cyclohexylphenyl)-α-benzoyloxy propionic acid compounds of the present invention and other α-acylated β-(4-cycloalkylphenyl)lactic acid compounds are produced by reacting the corresponding β-(4-cycloalkylphenyl)lactates or lactic acids with an acid chloride or acid anhydride in the presence of a tertiary amine such as pyridine, picoline or quinoline. This reaction results in the formation of an hydroxy derivatives of the lactate or lactic acid. Examples of the acid chloride or acid anhydride include acetyl chloride, acetic anhydride, propionyl chloride, butyryl chloride, succinic anhydride, maleic anhydride, phthalic anhydride, benzyl chlorocarbonate, ethyl chlorocarbonate, dimethylcarbamyl chloride, dibutyl carbamyl chloride, benzenesulfonyl chloride, methanesulfonyl chloride, and more particularly benzoylchloride and benzoic anydride.

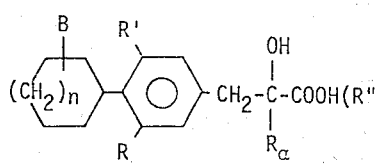

where:

R" is lower alkyl or benzyl.

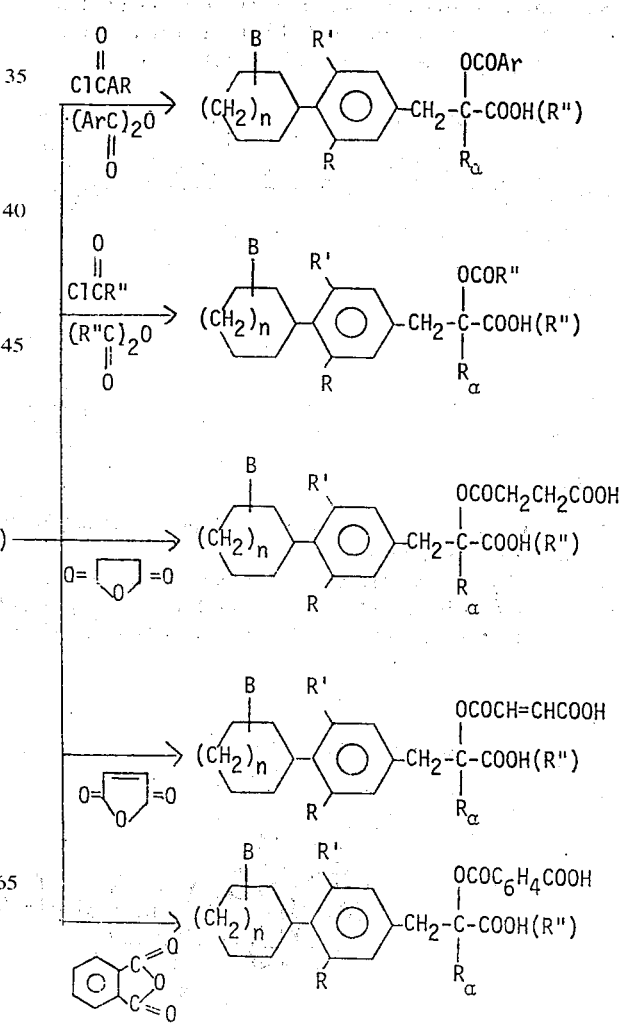

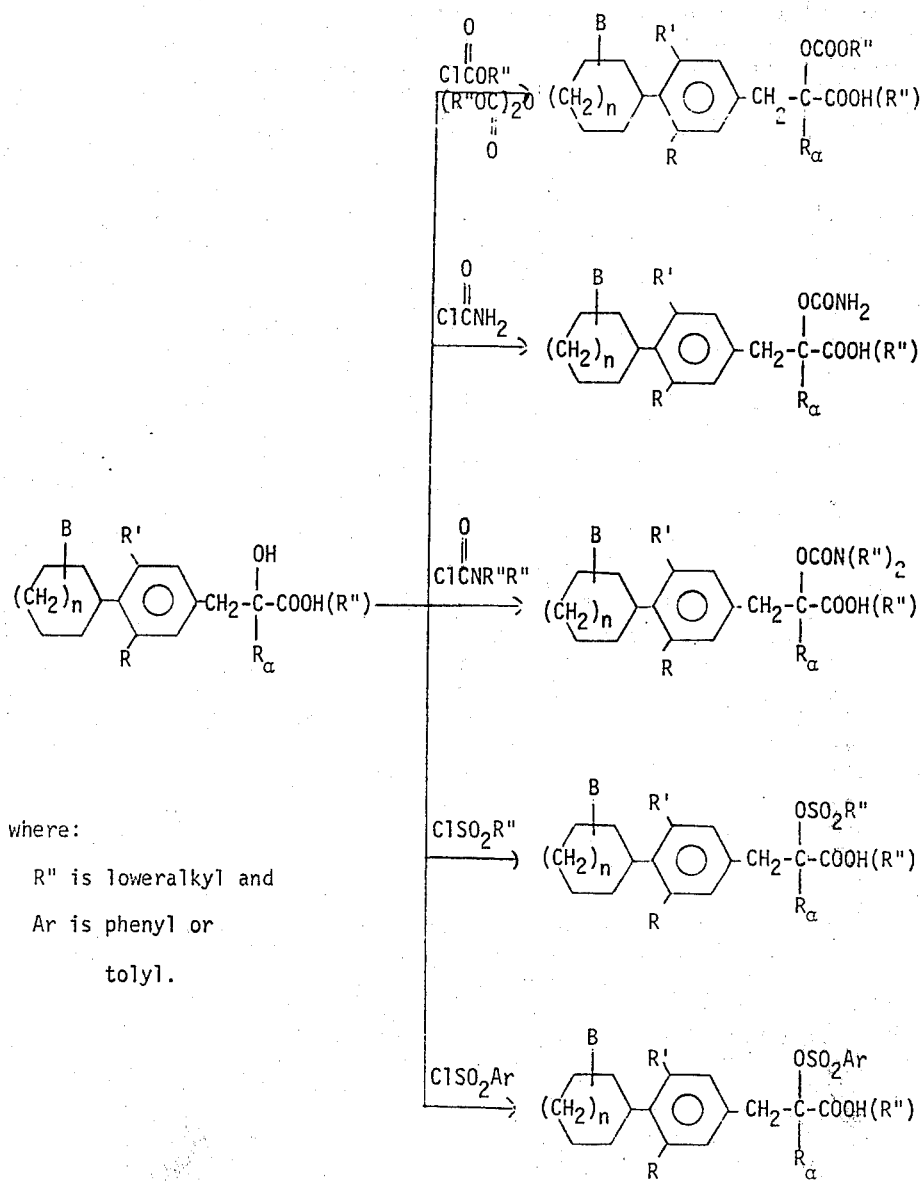

where:

R" is loweralkyl and

Ar is phenyl or tolyl.

The corresponding acid salts, esters and amides of the foregoing alcohol derivatives may be prepared according to the previously described procedures, or the alcohol derivatives may be prepared directly on the acid salts, esters and amides.

When it is desired to have an alkyl group in the β-position of the side chain, a Reformatsky reaction may be carried out on a substituted p-cycloalkylphenyl alkyl ketone with an α-halo acetate in the presence of zinc. The resultant β-hydroxy-β-alkyl-β-(p-cycloalkyl-

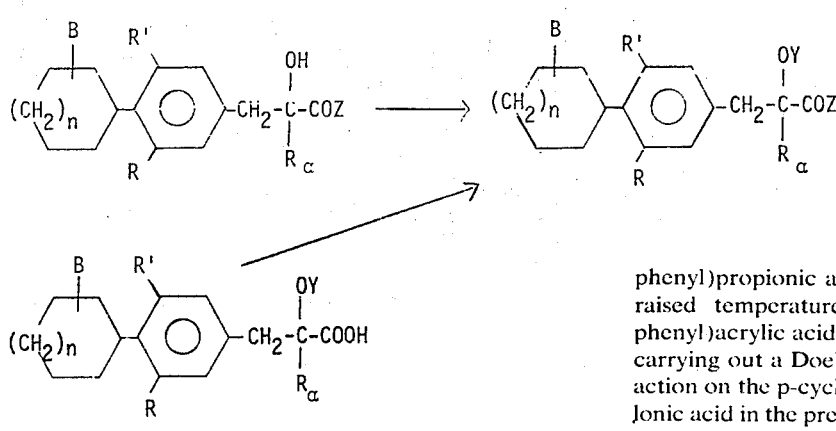

phenyl)propionic acid is then dehydrated with acid at raised temperatures to the β-alkyl-β-(p-cycloalkyl-phenyl)acrylic acid. This may also be accomplished by carrying out a Doebner modification of the Perkin reaction on the p-cycloalkylphenyl alkyl ketone with malonic acid in the presence of pyridine to obtain the β-alyl-β-(p-cycloalkylphenyl)acrylic acid. This, in turn, is then reacted as previously described to obtain the desired β-alkyl lactic, α-halopropionic or α-thiopropionic acids and derivatives.

These and other equivalent methods for the preparation of the acid, ester, amides, and salts of the instant products will be apparent to those having ordinary skill in the art U.S. Pat. No. 3,860,624 describes in detail

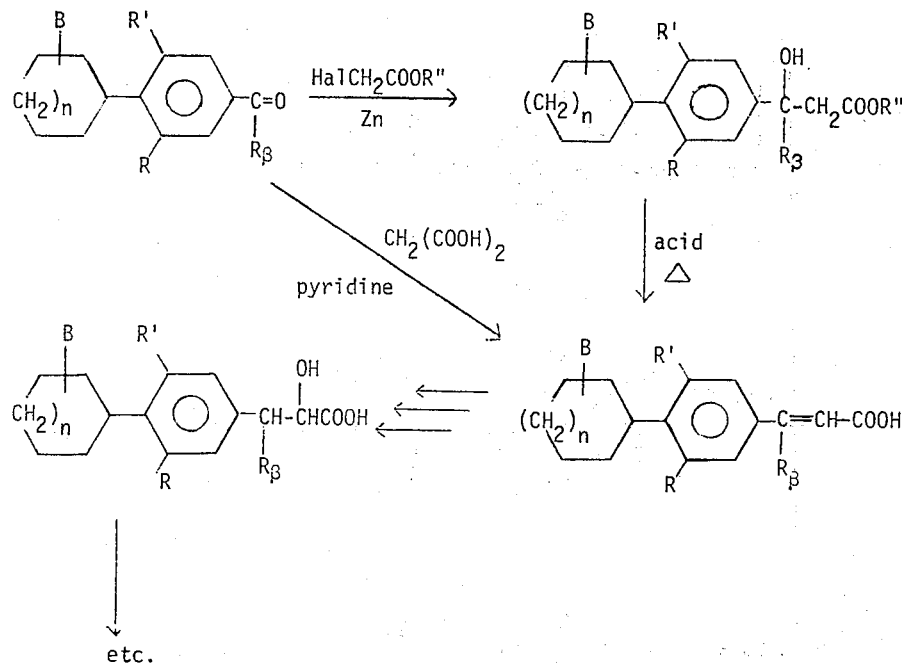

A further method for preparing the compounds of this invention is through the formation of a glycidic ester by the condensation of the proper aldehyde or ketone with an α-halo ester in the presence of an alkali alkoxide, alkali amide, or alkali hydride. The α,β-epoxy ester is then reduced to the corresponding lactate which in turn is then reacted as previously described. This method is also convenient in obtaining the α,β-dialkyl compounds of this invention.

the preparation of substituted p-cyclohexylphenyl alkanoic acid compounds including the compounds of the present invention, their compounding to useful pharmaceutical preparations, and their administration in therapy, dosage, and the like.

Since the β-carbon atom of the β-(3-chloro-4-cyclohexylphenyl)-α-benzoyloxy propionic acid compound according to the present invention is substituted with hydrogen, the products of this invention are ob-

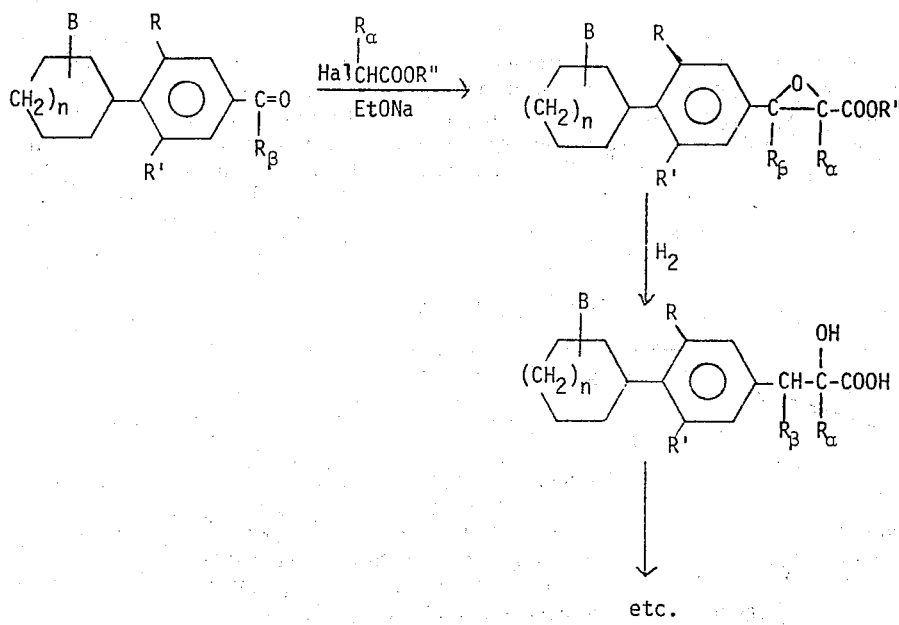

tained as racemic mixtures of their dextro and levorotatory isomers since the α-carbon is asymmetric. The racemic mixture may then be resolved into dextro and levorotatory optical isomers by conventional methods.

One method of resolution that may be employed is combining the racemic compound with an optically active compound by salt formation, ester formation, or amide formation to form two diasteromeric products. If the instant acids are added to an optically active base, then two diastereomeric salts are produced which posses different properties and different solubilities and can be separated by fractional crystallization. When the salts have been completely separated by repeated crystallization, the base is split off by acid hydrolysis and the pure d and l acids are obtained. Preferably, a cycloalkylphenyl-α-substituted propionic acid is reacted in alcoholic or acetone solution with an equivalent amount of the optically active primary, secondary or tertiary amine such as cinchonidine, cinchonine, quinine, ephedrine, α-methylbenzylamine, sec-butylamine, sec-amylamine, etc. The diastereomeric amine salts produced thereby, are separated by fractional crystallization and each optically salt is hydrolyzed with dilute mineral acid to produce the dextro or levo form of the cycloalkylphenyl-α-substituted propionic acid. Each optical isomer may be reacted then with YCl or YOY to produce the corresponding optically active alcoholic derivative. Alternatively, a cycloalkylphenyl-α-substituted propionate ester may be reacted with an optically active primary or secondary amine such as ephedrine, α-methylbenzylamine, sec-butylamine, etc., to produce a mixture of diastereomeric cycloalkylphenyl-α-substituted propionamide which may be separated by fractional crystallization. Each optically active amide may be hydrolyzed with mineral acid to its respective optically active acid.

Still alternatively, a cycloalkylphenyl-α-substituted propionate may be reacted with an optically active alcohol such as l-menthol or d-borneol, or l-α-methylbenzylalcohol, to produce a mixture of diastereomeric cycloalkylphenyl-α-substituted propionate esters which may be separated by fractional crystallization. Each optically active ester may be hydrolyzed with mineral acid or alkali to its respective optically active acid. The optically active acids can also be recovered from the α-methylbenzyl esters by hydrogenolysis in the presence of palladium. In this manner the α-oxy, α-halo, α-thio, α-cyano or α-amino isomers may be prepared.

I have found that the compounds of this invention exercise a useful degree of anti-inflammatory activity in mammals and are effective in the treatment of associated pain and fever and in like conditions which are responsive to treatment with anti-inflammatory agents. In general, the compounds of this invention are indicated for a wide variety of mammalian conditions where the symptoms of inflammation and associated fever and pain are manifested. Exemplary of such conditions are: rheumatic diseases such as rheumatoid arthritis, osteoarthritis and other degenerative joint diseases; soft-tissue rheumatism such as tendinitis; muscular rheumatism such as sciatica; pain and inflammation associated with dental surgery and similar human and veterinary disease conditions exhibiting the foregoing symptoms requiring the use of an anti-inflammatory, analgesic and/or antipyretic agent.

For these purposes, the compounds of this invention are normally administered orally, topically, parenterally or rectally. Orally, these may be administered in tablets, capsules, suspensions or syrups; the optimum dosage, of course, depending on the particular compound being used and the type and severity of the condition being treated. In any specific case the appropriate dosage selected will further depend on factors of the patient which may influence response to the drug; for example, general health, age, weight, etc. Although the optimum quantities of the compounds of this invention to be used in such manner will depend on the compound employed and the particular type of disease condition treated, oral dose levels of preferred compounds when administered to a mammal in dosages of 0.5 to 100 milligrams per kilogram of body weight per day are particularly useful. The preferred range is 0.5 to 15 mg/Kg. Comparative dosages may be used in topical, parenteral or rectal administration.

Dosage forms may be prepared according to any method known to the art for the manufacture of pharmaceutical compositions and such compositions may contain one or more agents; for example, sweetening agents, flavoring agents, coloring agents, preserving agents, etc. Further, the active p-cycloalkylphenyl-α-substituted propionic acids or their derivatives may be administered alone or in admixture with antacids such as sodium bicarbonate, magnesium carbonate, magnesium hydroxide, aluminum hydroxide, magnesium silicate, etc., and non-toxic pharmaceutically acceptable excipients. Such excipients may be, for example, inert diluents such as calcium carbonate, lactose, etc., granulating and disintegrating agents; for example maize starch, alginic acid, etc., lubricating agents; for example, magnesium stearate, talc, etc., binding agents; for example, starch gelatin, etc., suspending agents; for example, methylcellulose, vegetable oil, etc., dispersing agents; for example, lecithin, etc., thickening agents; for example, beeswax, hard paraffin, etc., emulsifying agents; for example, naturally occu-ring gums, etc., and non-irritating excipients; for example, cocoa butter and polyethylene glycols.

Various tests in animals can be carried out to show the ability of the p-cycloalkylphenyl-α-substituted propionic acids and derivatives of this invention to exhibit reactions that can be correlated with anti-inflammatory activity in humans. One such test is the carrageenan paw edema test, which shows the ability of the instant compounds to inhibit edema induced by injection of an inflammatory agent such as carrageenan into the tissues of the paw of a rat against non-inflammed controls. This carrageenan testing method is known to correlate well with anti-inflammatory activity in humans and is a standard test used to determine anti-inflammatory activity. This correlation can be shown by the activities of compounds known to be clinically active including such as aspirin, phenylbutazone, cortisone, hydrocortisone, indomethacin and prednisolone. In view of the results of this test, the p-cycloalkylphenyl-α-substituted propionic acids and derivatives can be considered to be active anti-inflammatory agents.

One method for measuring the pain and threshold of the p-cycloalkylphenyl-α-substituted propionic acids and derivatives is the Randall-Sclitto test. Analgesic activity is shown by antinocieceptive testing of the inflammed foot of rats and a measurement of their pain response.

Anti-pyretic assay is carried out by yeast-induced fever tests of subcutaneously injected rats. The measurement of rectal temperatures is carried out to determine the response by the test compounds.

In view of the results of the above tests, the p-cycloalkylphenyl-α-substituted propionic acids and derivatives of this invention are considered to have valuable analgesic and antipyretic properties.

Other tests which can be correlated to show significant activities are the "phenylquinone writhing" test for analgesia, "polyarthritis in rats" and "ultra-violet erythema in guinea pigs."

The following are detailed examples which show the preparation of the compounds of this invention. They are to be construed as illustrations of said compounds and not as limitations thereof.

EXAMPLE 1

3-Chloro-4-cyclohexylbenzaldehyde p-Cyclohexylbenzaldehyde 71.5 g. (0.38 mole) and .1 g. of iodine (0.048 mole) are dissolved in 100 ml. of carbon tetrachloride. To this solution is added a solution of 40.4 g. (0.57 mole) of chlorine dissolved in 65 ml. of carbon tetrachloride over a period of 2 hours. During the addition, the temperature of the reaction mixture is maintained at 0°C. The mixture is stirred for 3 hours and allowed to stand with gradual warming to room temperature over 15 hours. The solvent is removed by distillation under reduced pressure. The residue is fractionally distilled to obtain 3-chloro-4-cyclohexylbenzaldehyde.

When p-cyclohexylbenzaldehyde in the above example is replaced with the aldehydes of Table I below, then the corresponding product of Table II below is prepared.

Table I p-cyclopentylbenzaldehyde
p-(2'-methylcyclopentyl)benzaldehyde
p-cycloheptylbenzaldehyde
p-(2'-methylcycloheptyl)benzaldehyde
p-(2'-methylcyclohexyl)benzaldehyde
p-(3'-methylcyclohexyl)benzaldehyde
p-(4'-methylcyclohexyl)benzaldehyde Table II 3-chloro-4-cyclopentylbenzaldehyde
3-chloro-4-(2'-methylcyclopentyl)benzaldehyde
3-chloro-4-cycloheptylbenzaldehyde
3-chloro-4-(2'-methylcycloheptyl)benzaldehyde
3-chloro-4-(2'-methylcyclohexyl)benzaldehyde
3-chloro-4-(3'-methylcyclohexyl)benzaldehyde
3-chloro-4-(4'-methylcyclohexyl)benzaldehyde

EXAMPLE 2

3,5-dichloro-4-cyclohexylbenzaldehyde p-Cyclohexylbenzaldehyde 35.8 g. (0.19 mole) and .1 g. of iodine are dissolved in 100 ml. of carbon tetrachloride. To this solution is added a solution of 56.7 g. (0.8 mole) of chlorine dissolved in 500 ml. of carbon tetrachloride over a period of 3 hours. During the addition, the temperature of the reaction mixture is maintained at 0°C. The mixture is stirred for 3 hours and allowed to stand with gradual warming to room temperature over 30 hours. The solvent is removed in vacuo. The residue is fractionally distilled to obtain 3,5-dichloro-4-cyclohexylbenzaldehyde.

When p-cyclohexylbenzaldehyde in the above example is replaced by the benzaldehydes of Example 2, then the corresponding product of Table I below is prepared.

Table I 3,5-dichloro-4-cyclopentylbenzaldehyde
3,5-dichloro-4-(2'-methylcyclopentyl)benzaldehyde
3,5-dichloro-4-cycloheptylbenzaldehyde
3,5-dichloro-4-(2'-methylcycloheptyl)benzaldehyde
3,5-dichloro-4-(2'-methylcyclohexyl)benzaldehyde
3,5-dichloro-4-(3'-methylcyclohexyl)benzaldehyde
3,5-dichloro-4-(4'-methylcyclohexyl)benzaldehyde

EXAMPLE 3

When bromine is used in place of chlorine in Examples 1 and 2, the products obtained are shown in Tables I and II below.

Table I 3-bromo-4-cyclopentylbenzaldehyde
3-bromo-4-(2'-methylcyclopentyl)benzaldehyde
3-bromo-4-cycloheptylbenzaldehyde
3-bromo-4-(2'-methylcycloheptyl)benzaldehyde
3-bromo-4-cyclohexylbenzaldehyde
3-bromo-4-(2'-cyclohexyl)benzaldehyde
3-bromo-4-(3'-cyclohexyl)benzaldehyde
3-bromo-4-(4'-cyclohexyl)benzaldehyde Table II 3,5-dibromo-4-cyclopentylbenzaldehyde
3,5-dibromo-4-(2'-methylcyclopentyl)benzaldehyde
3,5-dibromo-4-cyclopheptylbenzaldehyde
3,5-dibromo-4-(2'-methylcycloheptyl)benzaldehyde
3,5-dibromo-4-cyclohexylbenzaldehyde
3,5-dibromo-4-(2'-methylcyclohexyl)benzaldehyde
3,5-dibromo-4-(3'-methylcyclohexyl)benzaldehyde
3,5-dibromo-4-(4'-methylcyclohexyl)benzaldehyde

EXAMPLE 4

3-Nitro-4-cyclohexylbenzaldehyde p-Cyclohexylbenzaldehyde 12.4 g. (0.066 mole) is added to ice-cold concentrated sulfuric acid (18 ml.) and stirred with cooling for 5 minutes. Concentrated nitric acid (Sp. G. 1.51) (2.5 ml.) is added dropwise, maintaining the temperature between 30° and 40° by water cooling if necessary. After addition of the nitric acid is complete, the mixture is stirred for ½ hour, then poured into water. The mixture is made alkaline with sodium hydroxide, then extracted with ether. The ether extract is washed, dried over sodium sulfate, evaporated and the residue is fractionally distilled to obtain 3-nitro-4-cyclohexylbenzaldehyde.

When p-cyclohexylbenzaldehyde in the above example is replaced by the benzaldehydes of Example 1, then the corresponding product of Table I below is prepared.

Table I 3-nitro-4-cyclopentylbenzaldehyde
3-nitro-4-(2'-methylcyclopentyl)benzaldehyde
3-nitro-4-cycloheptylbenzaldehyde
3-nitro-4-(2'-methylcycloheptyl)benzaldehyde
3-nitro-4-(2'-methylcyclohexyl)benzaldehyde 3-nitro-4-(3'-methylcyclohexyl)benzaldehyde
3-nitro-4-(4'-methylcyclohexyl)benzaldehyde When p-cyclohexylbenzaldehyde in the above example is replaced by the benzaldehyde of Example 2 and Table I of Example 3, then the corresponding product of Table II below is prepared.

Table II 3-chloro-5-nitro-4-cyclopentylbenzaldehyde
3-chloro-5-nitro-4-(2'-methylcyclopentyl)benzaldehyde
3-chloro-5-nitro-4-cycloheptylbenzaldehyde
3-chloro-5-nitro-4-(2'-methylcycloheptyl)benzaldehyde
3-chloro-5-nitro-4-(2'-methylcyclohexyl)benzaldehyde
3-chloro-5-nitro-4-(3'-methylcyclohexyl)benzaldehyde
3-chloro-5-nitro-4-(4'-methylcyclohexyl)benzaldehyde
3-chloro-5-nitro-4-cyclohexylbenzaldehyde
3-bromo-5-nitro-4-cyclopentylbenzaldehyde
3-bromo-5-nitro-4-(2'-methylcyclopentyl)benzaldehyde
3-bromo-5-nitro-4-cycloheptylbenzaldehyde -(
3-bromo-5-nitro-4-(2'-methylcycloheptyl)benzaldehyde
3-bromo-5-nitro-4-cyclohexylbenzaldehyde
3-bromo-5-nitro-4-(2'-methylcyclohexyl)benzaldehyde
3-bromo-5-nitro-4-(3'-methylcyclohexyl)benzaldehyde
3-bromo-5-nitro-4-(4'-methylcyclohexyl)benzaldehyde

EXAMPLE 5

3,5-Dinitro-4-cyclohexylbenzaldehyde p-Cyclohexylbenzaldehyde 12.4 g. (0.066 mole) is added to icecold concentrated sulfuric acid (54 ml.) and stirred with cooling for 5 minutes. Concentrated nitric acid (Sp. G. 1.51) (7.5 ml.) is added dropwise, maintaining the temperature between 30° and 40° by water cooling if necessary. After addition of the nitric acid is complete, the mixture is stirred for 3 hours, then poured into water. The mixture is made alkaline with sodium hydroxide, then extracted with ether. The ether extract is washed, dried over sodium sulfite, evaporated and the residue is fractionally distilled to obtain 3,5-dinitro-4-cyclohexylbenzaldehyde.

When p-cyclohexylbenzaldehyde in the above example is replaced by the benzaldehyde of Example 1, then the corresponding product of Table I below is prepared.

Table I 3,5-dinitro-4-cyclopentylbenzaldehyde
3,5-dinitro-4-(2'-methylcyclopentyl)benzaldehyde
3,5-dinitro-4-cycloheptylbenzaldehyde
3,5-dinitro-4-(2'-methylcycloheptyl)benzaldehyde
3,5-dinitro-4-(2'-methylcyclohexyl)benzaldehyde
3,5-dinitro-4-(3'-methylcyclohexyl)benzaldehyde
3,5-dinitro-4-(4'-methylcyclohexyl)benzaldehyde

EXAMPLE 6

β-(3-chloro-4-cyclohexylphenyl)cinnamic acid

A mixture of 22.2 g. (0.1 mole) of 3-chloro-4-cyclohexylbenzaldehyde is heated on a steam bath with 13.2 g. of malonic acid and 95 ml. of pyridine containing 5 drops of piperidine. The mixture is heated for four hours until the liberation of carbon dioxide ceases. The cooled mixture is poured into a mixture of 110 ml. concentrated hydrochloric acid and 500 ml. of ice-water. The solid which separates is filtered, washed with 15 ml. portions of cold water and then resuspended in 200 ml. of cold water, filtered, washed with cold water and dried at 40°C. The residue is then recrystallized from ethanol to obtain β-(3-chloro-4-cyclohexylphenyl)cinnamic acid.

When 3-chloro-4-cyclohexyl benzaldehyde in the above example is replaced with the benzaldehydes of Examples 1–5 then the corresponding products of Table I below are obtained.

Table I

β-(p-cyclopentylphenyl)cinnamic acid
β-[p-(2'-methylcyclopentyl)phenyl]cinnamic acid
β-(p-cycloheptylphenyl)cinnamic acid
β-[p-(2'-methylcycloheptyl)phenyl]cinnamic acid
β-[p-(2'-methylcyclohexyl)phenyl]cinnamic acid
β-[p-(3'-methylcyclohexyl)phenyl]cinnamic acid
β-[p-(4'-methylcyclohexyl)phenyl]cinnamic acid
β-(3-chloro-4-cyclopentylphenyl)cinnamic acid
β-[3-chloro-4-(2'-methylcyclopentyl)phenyl]cinnamic acid
β-(p-cyclohexylphenyl)cinnamic acid
β-(3,5-dichloro-4-cyclohexylphenyl)cinnamic acid
β-(3-chloro-4-cycloheptylphenyl)cinnamic acid
β-[3-chloro-4-(2'-methylcycloheptyl)phenyl]cinnamic acid
β-[3-chloro-4-(2'-methylcyclohexyl)phenyl]cinnamic acid
β-[3-chloro-4-(3'-methylcyclohexyl)phenyl]cinnamic acid
β-[3-chloro-4-(4'-methylcyclohexyl)phenyl]cinnamic acid
β-(3,5-dichloro-4-cyclopentylphenyl)cinnamic acid
β-[3,5-dichloro-4-(2'-methylcyclopentyl)phenyl]cinnamic acid
β-(3,5-dichloro-4-cycloheptylphenyl)cinnamic acid
β-[3,5-dichloro-4-(2'-methylcycloheptyl)phenyl]cinnamic acid
β-[3,5-dichloro-4-(2'-methylcyclohexyl)phenyl]cinnamic acid
β-[3,5-dichloro-4-(3'-methylcyclohexyl)phenyl]cinnamic acid
β-[3,5-dichloro-4-(4'-methylcyclohexyl)phenyl]cinnamic acid
β-(3-bromo-4-cyclopentylphenyl)cinnamic acid
β-[3-bromo-4-(2'-methylcyclopentyl)phenyl]cinnamic acid
β-(3-bromo-4-cycloheptylphenyl)cinnamic acid
β-[3-bromo-4-(2'-methylcycloheptyl)phenyl]cinnamic acid
β-(3-bromo-4-cyclohexylphenyl)cinnamic acid
β-[3-bromo-4-(2'-cyclohexyl)phenyl]cinnamic acid
β-[3-bromo-4-(3'-cyclohexyl)phenyl]cinnamic acid
β-[3-bromo-4-(4'-cyclohexyl)phenyl]cinnamic acid
β-(3,5-dibromo-4-cyclopentylphenyl)cinnamic acid
β-[3,5-dibromo-4-(2'-methylcyclopentyl)phenyl]cinnamic acid
β-(3,5-dibromo-4-cycloheptylphenyl)cinnamic acid
β-[3,5-dibromo-4-(2'-methylcycloheptyl)phenyl]cinnamic acid β-(3,5-dibromo-4-cyclohexylphenyl)cinnamic acid
β-[3,5-dibromo-4-(2'-methylcyclohexyl)phenyl]cinnamic acid
β-[3,5-dibromo-4-(3'-methylcyclohexyl)phenyl]cinnamic acid
β-[3,5-dibromo-4-(4'-methylcyclohexyl)phenyl]cinnamic acid
β-(3-nitro-4-cyclopentylphenyl)cinnamic acid
β-[3-nitro-4-(2'-methylcyclopentyl)phenyl]cinnamic acid
β-(3-nitro-4-cyclohexylphenyl)cinnamic acid
β-(3-nitro-4-cycloheptylphenyl)cinnamic acid
β-[3-nitro-4-(2'-methylcycloheptyl)phenyl]cinnamic acid
β-[3-nitro-4-(2'-methylcyclohexyl)phenyl]cinnamic acid
β-[3-nitro-4-(3'-methylcyclohexyl)phenyl] cinnamic acid
β-[3-nitio-4-(4'-methylcyclohexyl)phenyl]cinnamic acid
β-(3-chloro-5-nitro-4-cyclopentylphenyl)cinnamic acid
β-[3-chloro-5-nitro-4-(2'-methylcyclopentyl)phenyl]cinnamic acid
β-(3-chloro-5-nitro-4-cycloheptylphenyl)cinnamic acid
β[3-chloro-5-nitro-4-(2'-methylcycloheptyl)phenyl]cinnamic acid
β-[3-chloro-5-nitro-4-(2'-methylcyclohexyl)phenyl]cinnamic acid
β-[3-chloro-5-nitro-4-(3'-methylcyclohexyl)phenyl]cinnamic acid
β-[3-chloro-5-nitro-4-(4'-methylcyclohexyl)phenyl]cinnamic acid
β-(3-chloro-5-nitro-4-cyclohexylphenyl)cinnamic acid
β-(3-bromo-5-nitro-4-cyclopentylphenyl)cinnamic acid
β[3-bromo-5-nitro-4-(2'-methylcyclopentyl)phenyl] cinnamic acid
β-(3-bromo-5-nitro-4-cycloheptylphenyl)cinnamic acid
β-[3-bromo-5-nitro-4-(2'-methylcycloheptyl)phenyl]cinnamic acid
β(3-bromo-5-nitro-4-cyclohexylphenyl)cinnamic acid
β-[3-bromo-5-nitro-4-(2'-methylcyclohexyl)phenyl]cinnamic acid
β-[3-bromo-5-nitro-4-(3'-methylcyclohexyl)phenyl]cinnamic acid
β[3-bromo-5-nitro-4-(4'-methylcyclohexyl)phenyl]cinnamic acid
β(3,5-dinitro-4-cyclopentylphenyl)cinnamic acid
β-[3,5-dinitro-4-(2'-methylcyclopentyl)phenyl]cinnamic acid
β-(3,5-dinitro-4-cycloheptylphenyl)cinnamic acid
β-[3,5-dinitro-4-(2'-methylcycloheptyl)phenyl]cinnamic acid
β-[3,5-dinitro-4-(2'-methylcyclohexyl)phenyl]cinnamic acid
β-[3,5-dinitro-4-(3'-methylcyclohexyl)phenyl]cinnamic acid
β-[3,5dinitro-4-(4'-methylcyclohexyl)phenyl]cinnamic acid
β-(3,5-dinitro-4-cyclohexylphenyl)cinnamic acid

EXAMPLE 7

α,β-Dibromo-β-(3-chloro-4-cyclohexylphenyl)propionic acid

A mixture of 35 g. (0.13 mole) of β-(3-chloro-4-cyclohexylphenyl) cinnamic acid is gently boiled with 280 ml. of carbontetrachloride. To this hot suspension is added dropwise with stirring 7.1 ml. (0.13 mole) of bromine diluted with 15 ml. of carbontetrachloride over 50 min. The bath temperature is maintained at about 80°C and stirring and heating continued for 1-½ hours. The mixture is then cooled to room temperature and filtered to obtain α,β-dibrom-β-(3-chloro-4-cyclohexylphenyl)propionic acid.

when β-(3-chloro-4-cyclohexylphenyl)cinnamic acid in the above example is replaced with the cinnamic acid compounds of Example 6, then the products obtained are α,β-dibromo-β-(p-cyclopentylphenyl)propionic acid
α,β-dibromo-β-[p-(2'-methylcyclopentyl)phenyl]-propionic acid
α,β-dibromo-β-(p-cycloheptylphenyl)propionic acid
α,β-dibromo-β-[p-(2'-methylcycloheptyl)phenyl]-propionic acid
α,β-dibromo-β-[p-(2'-methylcyclohexyl)phenyl]-propionic acid
α,β-dibromo-β-[p-(3'-methylcyclohexyl)phenyl]-propionic acid
α,β-dibromo-β-[p-(4'-methylcyclohexyl)phenyl]-propionic acid
α,β-dibromo-β-(3-chloro-4-cyclopentylphenyl)propionic acid
α,β-dibromo-β-[3-chloro-4-(2'-methylcyclopentyl)phenyl]propionic acid
α,β-dibromo-β-(3-chloro-4-cycloheptylphenyl)propionic acid
α,β-dibromo-β-[3-chloro-4-(2'-methylcycloheptyl)phenyl]propionic acid
α,β-dibromo-β-[3-chloro-4-(2'-methylcyclohexyl)phenyl]propionic acid
α,β-dibromo-β-[3-chloro-4-(3'-methylcyclohexyl)phenyl]propionic acid
α,β-dibromo-β-[3-chloro-4-(4'-methylcyclohexyl)phenyl]propionic acid
α,β-dibromo-β-(3,5-dichloro-4-cyclopentylphenyl)-propionic acid
α,β-dibromo-β-[3,5-dichloro-4-(2'-methylcyclopentyl)phenyl]propionic acid
α,β-dibromo-β-(3,5-dichloro-4-cycloheptylphenyl)-propionic acid
α,β-dibromo-β-[3,5-dichloro-4-(2'-methylcycloheptyl)phenyl]propionic acid
α,β-dibromo-β-(p-cyclohexylphenyl)propionic acid
α,β-dibromo-β-(3,5-dichloro-4-cyclohexylphenyl)-propionic acid
α,β-dibromo-β-[3,5-methylcyclohexyl)phenyl]propionic acid
α,β-dibromo-β-[3,5-dichloro-4-(4'-methylcyclohexyl)phenyl]propionic acid
α,β-3-tribromo-β-(4-cyclopentylphenyl)propionic acid
α,β-3-tribromo-β-[4-(2'-methylcyclopentyl)phenyl]-propionic acid
α,β-3-tribromo-β-(4-cycloheptylphenyl)propionic acid
α,β-3-tribromo-β-[4-(2'-methylcycloheptyl)phenyl]-propionic acid
α,β-3-tribromo-β-(4-cyclohexylphenyl)propionic acid
α,β-3-tribromo-β-[4-(2'-cyclohexyl)phenyl]propionic acid α,β-3-tribromo-β-[4-(3'-cyclohexyl)phenyl]propionic acid
α,β-3-tribromo-β-[4-(4'-cyclohexyl)phenyl]propionic acid
α,β3,5-tetrabromo-β-(4-cyclopentylphenyl)propionic acid
α,β,3,5-tetrabromo-β-[4-(2'-methylcyclopentyl)phenyl]propionic acid
α,β,3,5-tetrabromo-β-(4-cycloheptylphenyl)propionic acid
α,β,3,5-tetrabromo-β-[4-(2'-methylcycloheptyl)phenyl]propionic acid
α,β,3,5-tetrabromo-β-(4-cyclohexylphenyl)propionic acid
α,β,3,5-tetrabromo-β-[4-(2'-methylcyclohexyl)phenyl]propionic acid
α,β,3,5-tetrabromo-β-[4-(3'methylcyclohexyl)phenyl]propionic acid
α,β,3,5-tetrabromo-β-[4-(4'-methylcyclohexyl)phenyl]propionic acid
α,β-dibromo-β-(3-nitro-4-cyclopentylphenyl)propionic acid
α,β-dibromo-β-[3-nitro-4-(2'-methylcyclopentyl)phenyl]propionic acid
α,β-dibromo-β-(3-nitro-4-cycloheptylphenyl)propionic acid
α,β-dibromo-β-[3-nitro-4-(2'-methylcycloheptyl)phenyl]propionic acid
α,β-dibromo-β-[3-nitro-4-(2'-methylcyclohexyl)phenyl]propionic acid
α,β-dibromo-β-[3-nitro-4-(3'-methylcyclohexyl)phenyl]propionic acid
α,β-dibromo-β-[3-nitro-4-(4'-methylcyclohexyl)phenyl]propionic acid
α,β-dibromo-β-(3-chloro-5-nitro-4-cyclopentylphenyl)propionic acid
α,β-dibromo-β-[3-chloro-5-nitro-4-(2'-methylcyclopentyl)phenyl]propionic acid
α,β-dibromo-β-(3-chloro-5-nitro-4-cycloheptylphenyl)propionic acid
α,β-dibromo-β-[3-chloro-5-nitro-4-(2'-methylcycloheptyl)phenyl]propionic acid
α,β-dibromo-β-(3-nitro-4-cyclohexylphenyl)propionic acid
α,β-dibromo-β-(3,5-dinitro-4-cyclohexylphenyl)propionic acid
α,β-dibromo-β-[3-chloro-5-nitro-4-(2'-methylcyclohexyl)phenyl]propionic acid
α,β-dibromo-β-[3-chloro-5-nitro-4-(3'-methylcyclohexyl)phenyl]propionic acid
α,β-dibromo-β-[3-chloro-5-nitro-4-(4'methylcyclohexyl)phenyl]propionic acid
α,β-dibromo-β-(3-chloro-5-nitro-4-cyclohexylphenyl)propionic acid
α,β,3-tribromo-β-(5-nitro-4-cyclopentylphenyl)propionic acid
α,β,3-tribromo-β-[5-nitro-4-(2'methylcyclopentyl)phenyl]propionic acid
α,β,3-tribromo-β-(5-nitro-4-cycloheptylphenyl)propionic acid
α,β,3-tribromo-β-[5-nitro-4-(2'-methylcyclohetpyl)phenyl]propionic acid
α,β,3-tribromo-β-(5-nitro-4-cyclohexylphenyl)propionic acid
α,β,3-tribromo-β-[5-nitro-4-(2'-methylcyclohexyl)phenyl]propionic acid
α,β,3-tribromo-β-[5-nitro-4-(3'-methylcyclohexyl)phenyl]propionic acid
α,β,3-tribromo-β-[5-nitro-4-(4'-methylcyclohexyl)phenyl]propionic acid
α,β-dibromo-β-(3,5-dinitro-4-cyclopentylphenyl)propionic acid
α,β-dibromo-β-[3,5-dinitro-4-(2'-methylcyclopentyl)phenyl]propionic acid
α,β-dibromo-β-(3,5-dinitro-4-cycloheptylphenyl)propionic acid
α,β-dibromo-β-[3,5-dinitro-4-(2'-methylcycloheptyl)phenyl]propionic acid
α,β-dibromo-β-[3,5-dinitro-4-(2'-methylcyclohexyl)phenyl]propionic acid
α,β-dibromo-β-[3,5-dinitro-4-(3'-methylcyclohexyl)phenyl]propionic acid
α,β-dibromo-β-[3,5-dinitro-4-(4'-methylcyclohexyl)phenyl]propionic acid

EXAMPLE 8

β-(3-Chloro-4-cyclohexylphenyl)pyruvic acid

A mixture of α,β-dibromo-β-(3-chloro-4-cyclohexylphenyl)propionic acid is treated with 3 moles of piperidine following the procedure of Henri Moureu, Paul Chovin and Michel Garein in Compt. Rendu 221, pages 410–2 (1945) to form a tripiperidyl adduct which on refluxing with 2N sulfuric acid gives β-(3-chloro-4-cyclohexylphenyl)pyruvic acid.

When α,β-dibromo-β-(3-chloro-4-cyclohexylphenyl)propionic acid in the above procedure is replaced by the propionic acids of Example 7, then the products prepared are described in Table I below.

β-(p-cyclopentylphenyl)pyruvic acid
β-[p-(2'-methylcyclopentyl)phenyl]pyruvic acid
β-(p-cycloheptylphenyl)pyruvic acid
β-[p-(2'-methylcycloheptyl)phenyl]pyruvic acid
β-[p-(2'-methylcyclohexyl)phenyl]pyruvic acid β-[p-(3'-methylcyclohexyl)phenyl]pyruvic acid
β-[p-(4'-methylcyclohexyl)phenyl]pyruvic acid
β-(3-chloro-4-cyclopentylphenyl)pyruvic acid
β-[3-chloro-4-(2'-methylcyclopentyl)phenyl]pyruvic acid
β-(p-cyclohexylphenyl)pyruvic acid
β-(3,5-dichloro-4-cyclohexylphenyl)pyruvic acid
β-(3-chloro-4-cycloheptylphenyl)pyruvic acid
β-[3-chloro-4-(2'-methylcycloheptyl)phenyl]pyruvic acid
β-[3-chloro-4-(2'-methylcyclohexyl)phenyl]pyruvic acid
β-[3-chloro-4-(3'-methylcyclohexyl)phenyl]pyruvic acid
β-[3-chloro-4-(4'-methylcyclohexyl)phenyl]pyruvic acid
β-(3,5-dichloro-4-cyclopentylphenyl)pyruvic acid
β-[3,5-dichloro-4-(2'-methylcyclopentyl)phenyl]pyruvic acid
β-(3,5-dichloro-4-cycloheptylphenyl)pyruvic acid
β-[3,5-dichloro-4-(2'-methylcycloheptyl)phenyl]pyruvic acid
β-[3,5-dichloro-4-(2'-methylcyclohexyl)phenyl]pyruvic acid
β-[3,5-dichloro-4-(3'-methylcyclohexyl)phenyl]pyruvic acid
β-[3,5-dichloro-4-(4'-methylcyclohexyl)phenyl]pyruvic acid
β-(3-bromo-4-cyclopentylphenyl)pyruvic acid 3-[3,5-dinitro-4-(2'-methylcyclopentyl)phenyl]-
  pyruvic acid
3-(3,5-dinitro-4-cycloheptylphenyl)pyruvic acid
3-[3,5-dinitro-4-(2'-methylcycloheptyl)phenyl]-
  pyruvic acid
3-[3,5-dinitro-4-(2'-methylcyclohexyl)phenyl]-
  pyruvic acid
3-[3,5-dinitro-4-(3'-methylcyclohexyl)phenyl]-
  pyruvic acid
β-[3,5-dinitro-4-(4'-methylcyclohexyl)phenyl]-
  pyruvic acid
β-(3,5-dinitro-4-cyclohexylphenyl)pyruvic acid

EXAMPLE 9

2-Phenyl-4-(3-chloro-4-cyclohexylbenzal)-5-oxazolone

A mixture of 13.3 g. (0.06 mole) of 3-chloro-4-clohexyl-benzaldehyde, 10 g. (0.06 mole) of hippuric acid and 9.6 g. (0.06 mole) of sodium acetate are ated in 200 ml. of acetic anhydride at 100°C with irring for 4 hours. The reaction mixture is cooled to om temperature and allowed to crystallize. The prod:t is filtered, washed with water and recrystallized om benzene to obtain 2-phenyl-4-(3-chloro-4-/clohexylbenzal)-5-oxazolone.

When 3-chloro-4-cyclohexylbenzaldehyde in the ove example is replaced with the aldehydes of Examples 1–5, then the product obtained is
2-phenyl-4-(p-cyclopentylbenzal)-5-oxazolone
2-phenyl-4-[p-(2'-methylcyclopentyl)benzal]-5-
  oxazolone
2-phenyl-4-(p-cycloheptylbenzal)-5-oxazolone
2-phenyl-4-[p-(2'-methylcycloheptyl)benzal]-5-
  oxazolone
2-phenyl-4-[p-(2'-methylcyclohexyl)benzal]-5-
  oxazolone
2-phenyl-4-[p-(3'-methylcyclohexyl)benzal]-5-
  oxazolone
2-phenyl-4-[p-(4'-methylcyclohexyl)benzal]-5-
  oxazolone
2-phenyl-4-(3-chloro-4-cyclopentylbenzal)-5-
  oxazolone
2-phenyl-4-[3-chloro-4-(2'-methylcyclopentyl)benzal]-5-oxazolone
2-phenyl-4-(p-cyclohexylbenzal)-5-oxazolone
2-phenyl-4-(3,5-dichloro-4-cyclohexylbenzal)-5-oxazolone
2-phenyl-4-(3-chloro-4-cycloheptylbenzal)-5-oxazolone
2-phenyl-4-[3-chloro-4-(2'-methylcycloheptyl)benzyl)-5-oxazolone
2-phenyl-4-[3-chloro-4-(2'-methylcyclohexyl)benzal]-5-oxazolone
2-phenyl-4-[3-chloro-4(3'-methylcyclohexyl)benzal]-5-oxazolone
2-phenyl-4-[3-chloro-4-(4'-methylcyclohexyl)benzal]-5-oxazolone
2-phenyl-4-(3,5-dichloro-4-cyclopentylbenzal)-5-oxazolone
2-phenyl-4-[3,5-dichloro-4-(2'-methylcyclopentyl)benzal)-5-oxazolone
2-phenyl-4-(3,5-dichloro-4-cycloheptylbenzal)-5-oxazolone
2-phenyl-4-[3,5-dichloro-4-(2'-methylcycloheptyl)benzal]-5-oxazolone
2-phenyl-4-[3,5-dichloro-4-(2'-methylcyclohexyl)benzal]-5-oxazolone
β-[3-bromo-4-(2'-methylcyclopentyl)phenyl]-
  pyruvic acid
β-(3-bromo-4-cycloheptylphenyl)pyruvic acid
β-[3-bromo-4-(2'-methylcycloheptyl)phenyl]-
  pyruvic acid
β-(3-bromo-4-cyclohexylphenyl)pyruvic acid
β-[3-bromo-4-(2'-cyclohexyl)phenyl]pyruvic acid
β-[3-bromo-4-(3'-cyclohexyl)phenyl]pyruvic acid
β-[3-bromo-4-(4'-cyclohexyl)phenyl]pyruvic acid
β-(3,5-dibromo-4-cyclopentylphenyl)pyruvic acid
β-[3,5-dibromo-4-(2'-methylcyclopentyl)phenyl]-
  pyruvic acid
β-(3,5-dibromo-4-cycloheptylphenyl)pyruvic acid
β-[3,5-dibromo-4-(2'-methylcycloheptyl)phenyl]-
  pyruvic acid
β-(3,5-dibromo-4-cyclohexylphenyl)pyruvic acid
β-[3,5-dibromo-4-(2'-methylcyclohexyl)phenyl]-
  pyruvic acid
β-[3,5-dibromo-4-(3'-methylcyclohexyl)phenyl]-
  pyruvic acid
β-[3,5-dibromo-4-(4'-methylcyclohexyl)phenyl]-
  pyruvic acid
β-(3-nitro-4-cyclopentylphenyl)pyruvic acid
β-[3-nitro-4-(2'-methylcyclopentyl)phenyl]pyruvic
  acid
β-(3-nitro-4-cyclohexylphenyl)pyruvic acid
β-(3-nitro-4-cycloheptylphenyl)pyruvic acid
β-[3-nitro-4-(2'-methylcycloheptyl)phenyl]pyruvic
  acid
β-[3-nitro-4-(2'-methylcyclohexyl)phenyl]pyruvic
  acid
β-[3-nitro-4-(3'-methylcyclohexyl)phenyl]pyruvic
  acid
β-[3-nitro-4-(4'-methylcyclohexyl)phenyl]pyruvic
  acid
β-(3-chloro-5-nitro-4-cyclopentylphenyl)pyruvic
  acid
β-[3-chloro-5-nitro-4-(2'-methylcyclopentyl)-
  phenyl]pyruvic acid
β-(3-chloro-5-nitro-4-cycloheptylphenyl)pyruvic
  acid
β-[3-chloro-5-nitro-4-(2'-methylcycloheptyl)-
  phenyl]pyruvic acid
β-[3-chloro-5-nitro-4-(2'-methylcyclohexyl)-
  phenyl]pyruvic acid
β-[3-chloro-5-nitro-4-(3'-methylcyclohexyl)-
  phenyl]pyruvic acid
β-[3-chloro-5-nitro-4-(4'-methylcyclohexyl)-
  phenyl]pyruvic acid
β-(3-chloro-5-nitro-4-cyclohexylphenyl)pyruvic acid
β-(3-bromo-5-nitro-4-cyclopentylphenyl)pyruvic
  acid
β-[3-bromo-5-nitro-4-(2'-methylcyclopentyl)-
  phenyl]pyruvic acid
β-(3-bromo-5-nitro-4-cycloheptylphenyl)pyruvic
  acid
β-[3-bromo-5-nitro-4-(2'-methylcycloheptyl)-
  phenyl]pyruvic acid
β-(3-bromo-5-nitro-4-cyclohexylphenyl)pyruvic acid
β-[3-bromo-5-nitro-4-(2'-methylcyclohexyl)-
  phenyl]pyruvic acid
β-[3-bromo-5-nitro-4-(3'-methylcyclohexyl)-
  phenyl]pyruvic acid
β-[3-bromo-5-nitro-4-(4'-methylcyclohexyl)-
  phenyl]pyruvic acid
β-(3,5-dinitro-4-cyclopentylphenyl)pyruvic acid 2-phenyl-4-[3,5-dichloro-4-(3'-methylcyclohexyl)benzal -5-oxazolone
2-phenyl-4-[3,5-dichloro-4-(4'-methylcyclohexyl)benzal]-5-oxazolone
2-phenyl-4-(3-bromo-4-cyclopentylbenzal)-5-oxazolone
2-phenyl-4-[3-bromo-4-(2'-methylcyclopentyl)benzal]-5-oxazolone
2-phenyl-4-(3-bromo-4-cycloheptylbenzal)-5-oxazolone
2-phenyl-4-[3-bromo-4-(2'-methylcycloheptyl)benzal]-5-oxazolone
2-phenyl-4-[3-bromo-4-(2'-cyclohexyl)benzal]-5-oxazolone
2-phenyl-4-[3-bromo-4-(3'-cyclohexyl)benzal]-5-oxazolone
2-phenyl-4-[3-bromo-4-(4'-cyclohexyl)benzal]-5-oxazolone
2-phenyl-4-(3,5-dibromo-4-cyclopentylbenzal)-5-oxazolone
2-phenyl-4-[3,5-dibromo-4-(2'-methylcyclopentyl)benzal]-5-oxazolone
2-phenyl-4-(3,5-dibromo-4-cycloheptylbenzal)-5-oxazolone
2-phenyl-4-[3,5-dibromo-4-(2'-methylcycloheptyl)benzal-5-oxazolone
2-phenyl-4-[3,5-dibromo-4-cyclohexylbenzal)-5-oxazolone
2-phenyl-4-[3,5-dibromo-4-(2'-methylcyclohexyl)benzal]-5-oxazolone
2-phenyl-4-[3,5-dibromo-4-(3'-methylcyclohexyl)benzal]-5-oxazolone
2-phenyl-4-[3,5-dibromo-4-(4'-methylcyclohexyl)benzal]-5-oxazolone
2-phenyl-4-(3-nitro-4-cyclopentylbenzol)-5-oxazolone
2-phenyl-4-[3-nitro-4-(2'-methylcyclophenyl)benzal]-5-oxazolone
2-phenyl-4-(3-nitro-4-cyclohexylphenyl)-5-oxazolone
2-phenyl-4-(3-nitro-4-cycloheptylbenzal)-5-oxazolone
2-phenyl-4-4-[3-nitro-4-(2'-methylcycloheptyl)benzal]-5-oxazolone
2-phenyl-4-[3-nitro-4-(2'-methcyclohexyl)benzal)-5-oxazolone
2-phenyl-4-(3'-methylcyclohexyl)benzal]-5-oxazolone
2-phenyl-4-[3-nitro-4-(4'-methylcyclohexyl)benzal]-5-oxazolone
2-phenyl-4-(3-chloro-5-nitro-4-cyclopentylbenzal)-5-oxazolone
2-phenyl-4-[3-chloro-5-nitro-4-(2'-methylcyclophentyl)benzal]-5-oxazolone
2-phenyl-4-(3-chloro-5-nitro-4-cycloheptylbenzal)-5-oxazolone
2-phenyl-4-[3-chloro-5-nitro-4-(2'-methylcycloheptyl)benzal]-5-oxazolone
2-phenyl-4-[3-chloro-5-nitro-4-(2'-methylcyclohexyl)benzal-5-oxazolone
2-phenyl-4-[3'-methylcyclohexyl)benzal]-5-oxazolone
2-phenyl-4-[3-chloro-5-nitro-4-(4'-methylcyclohexyl)benzal]-5-oxazolone
2-phenyl-4-(3-chloro-5-nitro-4-cyclohexylbenzal)-5-oxazolone
2-phenyl-4-(3-bromo-5-nitro-4-cyclopentylbenzal)-5-oxazolone
2-phenyl-4-[3-bromo-5-nitro-4-(2'-methylcyclopentyl)benzal]-5-oxazolone
2-phenyl-4-(3-bromo-5-nitro-4-cycloheptylbenzal)-5-oxazolone
2-phenyl-4-[3-bromo-5-nitro-4-(2'-methylcycloheptyl)benzal]-5-oxazolone
2-phenyl-4-(3-bromo-5-nitro-4-cyclohexylbenzal)-5-oxazolone
2-phenyl-4-[3-bromo-5-nitro-4-(2'-methylcyclohexyl)benzal]-5-oxazolone
2-phenyl-4-[3-bromo-5-nitro-43'-methylcyclohexyl)benzal]-5-oxazolone
2-phenyl-4-[3-bromo-5-nitro-4-(4'-methylcyclohexyl)benzal]-5-oxazolone
2-phenyl-4-(3,5-dinitro-4-cyclohexyl)-5-oxazolone
2-phenyl-4-[3,5-dinitro-4-(2'-methylcyclobenzal)-5-oxazolone
2-phenyl-4-(3,5-dinitro-4-cycloheptylbenza)-5-oxazolone
2-phenyl-4-[3,5-dinitro-4-(2'-methylcyclohexyl)benzal]-5-oxazolone
2-phenyl-4-[3,5-dinitro-4-(2'-methylcyclohexyl)benzal]-5-oxazolone
2-phenyl-4-[3,5-dinitro-4-(3'-methylcyclohexyl)benzal]-5-oxazolone
2-phenyl-4-(3,5-dinitro-4-cyclohexylbenzal)-5-oxazolone

EXAMPLE 10

β-(3-chloro-4-cyclohexylphenyl)pyruvic acid

A mixture of 2-phenyl-4-(3-chloro-4-cyclohexylbenzal)-5-oxazolone, 20 g. (0.055 mole) in 500 ml. of 10% NaOH solution under nitrogen atmosphere is refluxed for 15 hours. The hot reaction mixture is filtered. To the cold filtrate, 200 ml. of 6N HCl solution is slowly added with stirring. The solid is collected by filtration and air dried at room temperature. The crude product is dissolved in 210 ml. of glacial acetic acid and heated to boil for 10 minutes. The acidic mixture is stirred until room temperature is reached and 105 ml. of water is added drop-wise with stirring. The solid is collected by filtration, washed with water and dried at room temperature in vacuum to yield β-(3-chloro-4-cyclohexylphenyl)pyruvic acid.

When the oxazolones of Example 7 are used in the above procedure in place of 2-phenyl-4-(3-chloro-4-cyclohexylbenzal)-5-oxazolone, then the products obtained are those of Table I, Example 8.

EXAMPLE 11

Ethyl β-(3-chloro-4-cyclohexylphenyl)pyruvate

Reaction of β-(3-chloro-4-cyclohexylphenyl)pyruvic acid with absolute ethanol containing a small amount of anhydrous hydrochloric acid results in ethyl β-(3-chloro-4-cyclohexylphenyl)pyruvate.

When -(3-chloro-4-cyclohexylphenyl)pyruvic acid is replaced by the pyruvic acid compounds of Example 10, then the products prepared are
ethyl β-(p-cyclopentylphenyl)pyruvate
ethyl β-[p-(2'-methylcyclopentyl)phenyl]pyruvate
ethyl β-(p-cycloheptylphenyl)pyruvate
ethyl β-[p-(2'-methylcycloheptyl)phenyl]pyruvate
ethyl β-[p-(2'-methylcyclohexyl)phenyl]pyruvate
ethyl β-[p-(3'-methylcyclohexyl)phenyl]pyruvate ethyl β-[p-(4'-methylcyclohexyl(phenyl]pyruvate
ethyl β-(3-chloro-4-cyclopentylphenyl)pyruvate
ethyl β-[3-chloro-4-(2'-methylcyclopentyl)phenyl]pyruvate
ethyl β-(p-cyclohexylphenyl)pyruvate
ethyl β-(3,5-dichloro-4-cyclohexylphenyl)pyruvate
ethyl β-(3-chloro-4-cycloheptylphenyl)pyruvate
ethyl β-[3-chloro-4-(2'-methylcycloheptyl)phenyl]pyruvate
ethyl β-[3-chloro-4-(2'-methylcyclohexyl)phenyl]pyruvate
ethyl β-[3-chloro-4-(3'-methylcyclohexyl)phenyl]pyruvate
ethyl β-[3-chloro-4-(4'-methylcyclohexyl)phenyl]pyruvate
ethyl β-(3,5-dichloro-4-cyclopentylphenyl)pyruvate
ethyl β-[3,5-dichloro-4-(2'-methylcyclopentyl)phenyl]pyruvate
ethyl β-(3,5-dichloro-4,5-cycloheptylphenyl)pyruvate
ethyl β-[3,5-dichloro-4-(2'-methylcycloheptyl)phenyl]pyruvate
ethyl β-[3,5-dichloro-4-(2'-methylcyclohexyl)phenyl]pyruvate
ethyl β-[3,5-dichloro-4-(3'-methylcyclohexyl)phenyl]pyruvate
ethyl β-[3,5-dichloro-4-(4'-methylcyclohexyl)phenyl]pyruvate
ethyl β-(3-bromo-4-cyclopentylphenyl)pyruvate
ethyl β-[3-bromo-4-(2'-methylcyclopentyl)phenyl]pyruvate
ethyl β-(3-bromo-4-cycloheptylphenyl)pyruvate
ethyl β-[3-bromo-4-(2'-methylcyclopheptyl)phenyl]pyruvate
ethyl β-(3-bromo-4-cyclohexylphenyl)pyruvate
ethyl β-[3-bromo-4-(2'-cyclohexyl)phenyl]pyruvate
ethyl β-[3-bromo-4-(3'-cyclohexyl)phenyl]pyruvate
ethyl β-[3-bromo-4-(4'-cyclohexylphenyl]pyruvate
ethyl β-(3,5-dibromo-4-cyclopentylphenyl)pyruvate
ethyl β-[3,5-dibromo-4-(2'-methylcyclopentyl)phenyl]pyruvate
ethyl β-(3,5-dibromo-4-cycloheptylphenyl)pyruvate
ethyl β-[3,5-dibromo-4-(2'-methylcycloheptyl)phenyl]pyruvate
ethyl β-(3,5-dibromo-4-cyclohexylphenyl)pyruvate
ethyl β-[3,5-dibromo-4-(2'-methylcyclohexyl)phenyl]pyruvate
ethyl β-[3,5-dibromo-4-(3'-methylcyclohexyl)phenyl]pyruvate
ethyl β-[3,5-dibromo-4-(4'-methylcyclohexyl)phenyl]pyruvate
ethyl β-(3-nitro-4-cyclopentylphenyl)pyruvate
ethyl β-[3-nitro-4-(2'-methylcyclopentyl)phenyl]pyruvate
ethyl β-(3-nitro-4-cyclohexylphenyl)pyruvate
ethyl β-(3-nitro-4-cycloheptylphenyl)pyruvate
ethyl β-[3-nitro-4-(2'-methylcycloheptyl)phenyl]pyruvate
ethyl β-[3-nitro-4-(2'-methylcyclohexyl)phenyl]pyruvate
ethyl β-[3-nitro-4-(3'-methylcyclohexyl)phenyl]pyruvate
ethyl β-[3-nitro-4-(4'-methylcyclohexyl)phenyl]pyruvate
ethyl β-(3-chloro-5-nitro-4-cyclopentylphenyl)pyruvate
ethyl β-[3-chloro-5-nitro-4'-(2'-methylcyclopentyl)phenyl]pyruvate
ethyl β-(3-chloro-5-nitro-4-cycloheptylphenyl)pyruvate
ethyl β-[3-chloro-5-nitro-4-(2'-methylcycloheptyl)phenyl]pyruvate
ethyl β-[3-chloro-5-nitro-4-(2'-methylcyclohexyl)phenyl]pyruvate
ethyl β-[3-chloro-5-nitro-4-(3'-methylcyclohexyl)phenyl]pyruvate
ethyl β-[3-chloro-5-nitro-4-(4'-methylcyclohexyl)phenyl]pyruvate
ethyl β-(3-chloro-5-nitro-4-cyclohexylphenyl)pyruvate
ethyl β-(3-bromo-5-nitro-4-cyclopentylphenyl)pyruvate
ethyl β-[3-bromo-5-nitro-4-(2'-methylcyclopentyl)phenyl]pyruvate
ethyl β-(3-bromo-5-nitro-4-cycloheptylphenyl)pyruvate
ethyl β-[3-bromo-5-nitro-4-(2'-methylcycloheptyl)phenyl]pyruvate
ethyl β-(3-bromo-5-nitro-4-cyclohexyphenyl)pyruvate
ethyl β-[3-bromo-5-nitro-4-(2'-methylcyclohexyl)phenyl]pyruvate
ethyl β-[3-bromo-5-nitro-4-(3'-methylcyclohexyl)phenyl]pyruvate
ethyl β-[3-bromo-5-nitro-4-(4'-methylcyclohexyl)phenyl]pyruvate
ethyl β-(3,5-dinitro-4-cyclopentylphenyl)pyruvate
ethyl β-[3,5-dinitro-4-(2'-methylcyclopentyl)phenyl]pyruvate
ethyl β-(3,5-dinitro-4-cycloheptylphenyl)pyruvate
ethyl β-(3,5-dinitro-4-(2'-methylcycloheptyl)phenyl]pyruvate
ethyl β-[3,5-dinitro-4-(2'-methylcyclohexyl)phenyl]pyruvate
ethyl β-[3,5-dinitro-4-(3'-methylcyclohexyl)phenyl]pyruvate
ethyl β-[3,5-dinitro-4-(4'-methylcyclohexyl)phenyl]pyruvate
ethyl β-(3,5-dinitro-4-cyclohexylphenyl)pyruvate

EXAMPLE 12

Ethyl α-methyl-β-(3-chloro-4-cyclohexylphenyl)lactate

A solution of methylmagnesium iodide is prepared from 6.7 g. (0.047 mole) of methyl iodide, 1.24 g. (0.051 g-atom) of magnesium turnings and 40 ml. of anhydrous ether. This solution is added over a period of 1 hour to a solution (0.05 mole) of ethyl β-(3-chloro-4-cyclohexylphenyl)-pyruvate. The addition is carried out with vigorous stirring at 0–5°C. The mixture is then allowed to warm to room temperature over 10 hours. The mixture is poured into an ice-cold solution of 0.2 M-sulfuric acid. The ether layer is separated, extracted with 1% sulfuric acid, dried over magnesium sulfate, filtered and evaporated to obtain ethyl α-methyl-β-(3-chloro-4-cyclohexylphenyl)lactate.

When ethyl β-(3-chloro-4-cyclohexylphenyl)pyruvate in the above example is replaced by the pyruvates of Example 11, then the corresponding products are prepared.

ethyl α-methyl-β-(p-cyclopentylphenyl)lactate
ethyl α-methyl-β-[p-(2'-methylcyclopentyl)phenyl]lactate ethyl α-methyl-β-(p-cycloheptylphenyl)lactate
ethyl α-methyl-β-[p-(2'-methylcycloheptyl)phenyl]lactate
ethyl α-methyl-β-[p-(2'-methylcyclohexyl)phenyl]lactate
ethyl α-methyl-β-[p-(3'-methylcyclohexyl)phenyl]lactate
ethyl α-methyl-β-[p-(4°-methylcyclohexyl)phenyl]lactate
ethyl α-methyl-β-(3-chloro-4-cyclopentylphenyl)lactate
ethyl α-methyl-β-[3-chloro-4-(2'-methylcyclopentyl)phenyl]lactate
ethyl α-methyl-β-(p-cyclohexylphenyl)lactate
ethyl α-methyl-β-(3,5-dichloro-4-cyclohexylphenyl)lactate
ethyl α-methyl-β-(3-chloro-4-cycloheptylphenyl)lactate
ethyl α-methyl-β-[3-chloro-4-(2'-methylcycloheptyl)phenyl]lactate
ethyl α-methyl-β-[3-chloro-4-(2'-methylcyclohexyl)phenyl]lactate
ethyl α-methyl-β-[3-chloro-4-(3'-methylcyclohexyl)phenyl]lactate
ethyl α-methyl-β-[3-chloro-4-(4'-methylcyclohexyl)phenyl]lactate
ethyl α-methyl-β-(3,5-dichloro-4-cyclopentylphenyl)lactate
ethyl α-methyl-β-[3,5-dichloro-4-(2'-methylcyclopentyl)phenyl]lactate
ethyl α-methyl-β-(3,5-dichloro-4-cycloheptylphenyl)lactate
ethyl α-methyl-β-[3,5-dichloro-4-(2'-methylcycloheptyl)phenyl]lactate
ethyl α-methyl-β-[3,5-dichloro-4-(2'-methylcyclohexyl)phenyl]lactate
ethyl α-methyl-β-[3,5-dichloro-4-(3'-methylcyclohexyl)phenyl]lactate
ethyl α-methyl-β-[3,5-dichloro-4-(4'-methylcyclohexyl)phenyl]lactate
ethyl α-methyl-β-(3-bromo-4-cyclopentylphenyl)lactate
ethyl α-methyl-β-[3-bromo-4-(2'-methylcyclopentyl)phenyl]lactate
ethyl α-methyl-β-(3-bromo-4-cycloheptylphenyl)lactate
ethyl α-methyl-β-[3-bromo-4-(2'-methylcycloheptyl)phenyl]lactate
ethyl α-methyl-β-(3-bromo-4-cyclohexylphenyl)lactate
ethyl α-methyl-β-[3-bromo-4-(2'-cyclohexyl)phenyl]lactate
ethyl α-methyl-β-[3-bromo-4-93'-cyclohexyl)phenyl]lactate
ethyl α-methyl-β-[3-bromo-4-(4'-cyclohexyl)phenyl]lactate
ethyl α-methyl-β-(3,5-dibromo-4-cyclopentylphenyl)lactate
ethyl α-methyl-β-[3,5-dibromo-4-(2'-methylcyclopentyl)phenyl]lactate
ethyl α-methyl-β-(3,5-dibromo-4-cycloheptylphenyl)lactate
ethyl α-methyl-β-[3,5-dibromo-4-(2'-methylcycloheptyl)phenyl]lactate
ethyl α-methyl-β-(3,5-dibromo-4-cyclohexylphenyl)lactate
ethyl α-methyl-β-[3,5-bromo-4-(2'-methylcyclohexyl)phenyl]lactate
α-methyl-β-[3,5-dibromo-4-(3'-methylcyclohexyl)phenyl]lactate
ethyl α-methyl-β-[3,5-dibromo-4-(4'-methylcyclohexyl)phenyl]lactate
ethyl α-methyl-β-(3-nitro-4-cyclopentylphenyl)lactate
ethyl α-methyl-β-[3-nitro-4-(2'-methylcyclopentyl)phenyl]lactate
ethyl α-methyl-β-(3-nitro-4-cycloheptylphenyl)lactate
ethyl α-methyl-β-(3-nitro-4-cycloheptylphenyl)lactate
ethyl α-methyl-β-[3-nitro-4-(2'-methylcycloheptyl)phenyl]lactate
ethyl α-methyl-β-[3-nitro-4-(2'-methylcyclohexyl)phenyl]lactate
ethyl α-methyl-β-[3-nitro-4-(3'-methylcyclohexyl)phenyl]lactate
ethyl α-methyl-β-[3-nitro-4-(4'-methylcyclohexyl)phenyl]lactate
ethyl α-methyl-β-(3-chloro-5-nitro-4-cyclopentylphenyl)lactate
ethyl α-methyl-β-[3-chloro-5-nitro-4-(2'-methylcyclopentyl)phenyl]lactate
ethyl α-methyl-α-(3-chloro-5-nitro-4-cycloheptylphenyl)lactate
ethyl α-methyl-β-[3-chloro-5-nitro-4-(2'-methylcycloheptyl)phenyl]lactate
ethyl α-methyl-β-[3-chloro-5-nitro-4-(2'-methylcyclohexyl)phenyl]lactate
ethyl α-methyl-β-[3-chloro-5-nitro-4-(3'-methylcyclohexyl)phenyl]lactate
ethyl α-methyl-β-[3-chloro-5-nitro-4-(4'methylcyclohexyl)phenyl]lactate
ethyl α-nethyl-β-(3-chloro-5-nitro-4-cyclohexylphenyl)lactate
ethyl α-methyl-β-(3-bromo-5-nitro-4-cyclopentylphenyl)lactate
ethyl α-methyl-β-[3-bromo-5-nitro-4-(2'-methylcyclopentyl)phenyl]lactate
ethyl α-methyl-β-(3-bromo-5-nitro-4-cycloheptylphenyl)lactate
ethyl α-methyl-β-[3-bromo-5-nitro-4-(2'methylcycloheptyl)phenyl]lactate
ethyl α-methyl-β-(3-bromo-5-nitro-4-cyclohexylphenyl)lactate
ethyl α-methyl-β[3-bromo-5-nitro-4-(2'-methylcyclohexyl)phenyl]lactate
ethyl α-methyl-β-[3-bromo-5-nitro-4-(3'-methylcyclohexyl)phenyl]lactate
ethyl α-methyl-β-[3-bromo-5-nitro-4-(4'-methylcyclohexyl)phenyl]lactate
ethyl α-methyl-β-(3,5-dinitro-4-cyclopentylphenyl)lactate
ethyl α-methyl-β[3,5-dinitro-4-(2'-methylcyclopentyl)phenyl]lactate
ethyl α-methyl-β-(3,5-dinitro-4-cycloheptylphenyl)lactate
ethyl α-methyl-β-[3,5-dinitro-4-(2'-methylcycloheptyl)phenyl]lactate
ethyl α-methyl-β-[3,5-dinitro-4-(2'-methylcyclohexyl)phenyl]lactate
ethyl α-methyl-β-[3,5-dinitro-4-(3'-methylcyclohexyl)phenyl]lactate ethyl α-methyl-β-]3,5-dinitro-4-(4'-methylcyclohexyl)phenyl]lactate
ethyl α-methyl-β-(3,5-dinitro-4-cyclohexylphenyl)-lactate When the Grignard reagent used is ethylmagnesium iodide, propylmagnesium iodide or butylmagnesium iodide, then the product prepared is
ethyl α-ethyl-β-(3-chloro-4-cyclohexylphenyl)lactate
ethyl α-propyl-β-(3-chloro-4-cyclohexylphenyl)lactate
ethyl α-butyl-β-(3-chloro-4-cyclohexylphenyl)lactate

EXAMPLE 13

β-(3-chloro-4-cyclohexylphenyl)lactic acid

To a suspension of β-(3-chloro-4-cyclohexylphenyl)-ruvic acid 8.64 g. (0.031 mole) in 300 ml. of 90% hanol is added 1 ml. of 0.1M ferrous sulfate solution llowed by 0.5 g. of platinum oxide catalyst. The mixre is shaken with hydrogen for 3½ hours. The catalyst filtered off. The dark yellow filtrate is distilled under duced pressure to yield β-(3-chloro-4-cyclohexylhenyl)lactic acid.

When β-(3-chloro-4-cyclohexylphenyl)pyruvic acid replaced in the above procedure by the pyruvic acids Example 8, then the products prepared are
β-(p-cyclopentylphenyl)lactic acid
β-[p-(2'-methylcyclopentyl)phenyl]lactic acid
β-(p-cycloheptylphenyl)lactic acid
β-[p-(2'-methylcycloheptyl)phenyl]lactic acid
β-[p-(2'-methylcyclohexyl)phenyl]lactic acid
β-[p-(3'-methylcyclohexyl)phenyl]lactic acid
β-[p-(4'-methylcyclohexyl)phenyl]lactic acid
β-(3-chloro-4-cyclopentylphenyl)lactic acid
β-[3-chloro-4-(2'-methylcyclopentyl)phenyl]lactic acid
β-(p-cyclohexylphenyl)lactic acid
β-(3,5-dichloro-4-cyclohexylphenyl)lactic acid
β-(3-chloro-4-cycloheptylphenyl)lactic acid
β-[3-chloro-4-(2'-methylcycloheptyl)phenyl]lactic acid
β-[3-chloro-4-(2'-methylcyclohexyl)phenyl]lactic acid
β-[3-chloro-4-(3'-methylcyclohexyl)phenyl]lactic acid
β-[3-chloro-4-(4'-methylcyclohexyl)phenyl]lactic acid
β-(3,5-dichloro-4-cyclopentylphenyl)lactic acid
β-[3,5-dichloro-4-(2'-methylcyclopentyl)phenyl]lactic acid
β-(3,5-dichloro-4-cycloheptylphenyl)lactic acid
β-[3,5-dichloro-4-(2'-methylcycloheptyl)phenyl]lactic acid
β-[3,5-dichloro-4-(2'-methylcyclohexyl)phenyl]lactic acid
β-[3,5-dichloro-4-(3'-methylcyclohexyl)phenyl]lactic acid
β-[3,5-dichloro-4-(4'-methylcyclohexyl)phenyl]lactic acid
β-(3-bromo-4-cyclopentylphenyl)lactic acid
β-[3-bromo-4-(2'-methylcyclopentyl)phenyl]lactic acid
β-(3-bromo-4-cycloheptylphenyl)lactic acid
β-[3-bromo-4-(2'-methylcycloheptyl)phenyl]lactic acid
β-(3-bromo-4-cyclohexylphenyl)lactic acid
β-[3-bromo-4-(2'-cyclohexyl)phenyl]lactic acid
β-[3-bromo-4-(3'-cyclohexyl)phenyl]lactic acid
β-[3-bromo-4-(4'-cyclohexyl)phenyl]lactic acid
β-(3,5-dibromo-4-cyclopentylphenyl)lactic acid
β-[3,5-dibromo-4-(2'-methylcyclopentyl)phenyl]lactic acid
β-(3,5-dibromo-4-cycloheptylphenyl)lactic acid
β-[3,5-dibromo-4-(2'-methylcycloheptyl)phenyl]lactic acid
β-(3,5-dibromo-4-cyclohexylphenyl)lactic acid
β-[3,5-dibromo-4-(2'-methylcyclohexyl)phenyl]lactic acid
β[3,5-dibromo-4-(3'-methylcyclohexyl)phenyl]lactic acid
β-[3,5-dibromo-4-(4'-methylcyclohexyl)phenyl]lactic acid When the pyruvate esters are used in the above procedures the corresponding products are prepared
ethyl β-(p-cyclopentylphenyl)lactate
ethyl β-[p-(2'-methylcyclopentyl)phenyl]lactate
ethyl β-(p-cycloheptylphenyl)lactate
ethyl β-[p-(2'-methylcycloheptyl)phenyl]lactate
ethyl β-[p-(2'-methylcyclohexyl)phenyl]lactate
ethyl β-[p-(3'-methylcyclohexyl)phenyl]lactate
ethyl β-[p-(4'-methylcyclohexyl)phenyl]lactate
ethyl β-(3-chloro-4-cyclopentylphenyl)lactate
ethyl β-[3-chloro-4-(2'-methylcyclopentyl)phenyl]lactate
ethyl β-(p-cyclohexylphenyl)lactate
ethyl β-(3,5-dichloro-4-cyclohexylphenyl)lactate
ethyl β-(3-chloro-4-cycloheptylphenyl)lactate
ethyl β-[3-chloro-4-(2'-methylcycloheptyl)phenyl]lactate
ethyl β-[3-chloro-4-(2'-methylcyclohexyl)phenyl]lactate
ethyl β-[3-chloro-4-(3'-methylcyclohexyl)phenyl]lactate
ethyl β-[3-ch-oro-4-(4'-methylcyclohexyl)phenyl]lactate
ethyl β-(3,5-dichloro-4-cyclopentylphenyl)lactate
ethyl β-[3,5-dichloro-4-(2'-methylcyclopentyl)phenyl]lactate
ethyl β-(3,5-dichloro-4-cycloheptylphenyl)lactate
ethyl β-[3,5-dichloro-4-(2'-methylcycloheptyl)phenyl]lactate
ethyl β-[3,5-dichloro-4-(2'-methylcyclohexyl)phenyl]lactate
ethyl β-[3,5-dichloro-4-(3'-methylcyclohexyl)phenyl]lactate
ethyl β-[3,5-dichloro-4-(4'-methylcyclohexyl)phenyl]lactate
ethyl β-(3-bromo-4-cyclopentylphenyl)lactate
ethyl β-[3-bromo-4-(2'-methylcyclopentyl)phenyl]lactate
ethyl β-(3-bromo-4-cycloheptylphenyl)lactate
ethyl β-[3-bromo-4-(2'-methylcycloheptyl)phenyl]lactate
ethyl β-(3-bromo-4-cyclohexylphenyl)lactate
ethyl β-[3-bromo-4-(2'-cyclohexyl)phenyl]lactate
ethyl β-[3-bromo-4-(3'-cyclohexyl)phenyl]lactate
ethyl β-[3-bromo-4-(4'-cyclohexyl)phenyl]lactate
ethyl β-(3,5-dibromo-4-cyclopentylphenyl)lactate
ethyl β-[3,5-dibromo-4-(2'-methylcyclopentyl)phenyl]lactate
ethyl β-(3,5-dibromo-4-cycloheptylphenyl)lactate
ethyl β-[3,5-dibromo-4-(2'-methylcycloheptyl)phenyl]lactate
ethyl β-(3,5-dibromo-4-cyclohexylphenyl)lactate ethyl β-[3,5-dibromo-4-(2'-methylcyclohexyl)phenyl]lactate
ethyl β-[3,5-dibromo-4-(3'-methylcyclohexyl)phenyl]lactate
ethyl β-[3,5-dibromo-4-(4'-methylcyclohexyl)phenyl]lactate

EXAMPLE 14

Ethyl β-(3-nitro-4-cyclohexylphenyl)lactate

A sodium borohydride solution (1.142 g., 0.302 mole in 13 ml. of water containing 1 drop of 10 N sodium hydroxide) is added dropwise to a stirred solution of 18.4 g. (0.059 mole) of ethyl β-(3-nitro-4-cyclohexylphenyl)pyruvate, methanol (50 ml.) and water (5 ml.) cooled in an ice-water mixture. The solution is partially neutralized with urea-active acid solution (15 ml. each of acetic acid and urea 0.041 mole). The pH after the addition is near neutral. The pH then is adjusted to acidic by addition of 18 N sulfuric acid (2.8 ml.). The product is extracted with ether, washed with 2 × 25 ml. of saturated sodium bisulfite and then dried over anhydrous sodium sulfite for 2 hours. The drying agent is removed and the solvent is then removed to obtain ethyl β-(3-nitro-4-cyclohexylphenyl)lactate.

When the above procedure is followed using the nitro compounds of this invention then the corresponding products are prepared ethyl β-(3-nitro-4-cyclopentylphenyl)lactate
ethyl β-[3-nitro-4-(2'-methylcyclopentyl)phenyl]lactate
ethyl β-(3-nitro-4-cyclohexylphenyl)lactate
ethyl β-(3-nitro-4-cycloheptylphenyl)lactate
ethyl β-[3-nitro-4-(2'-methylcycloheptyl)phenyl]lactate
ethyl β-[3-nitro-4-(2'-methylcyclohexyl)phenyl]lactate
ethyl β-[3-nitro-4-(3'-methylcyclohexyl)phenyl]lactate
ethyl β-[3-nitro-4-(4'-methylcyclohexyl)phenyl]lactate
ethyl β-(3-chloro-5-nitro-4-cyclopentylphenyl)lactate
ethyl β-[3-chloro-5-nitro-4-(2'-methylcyclopentyl)phenyl]lactate
ethyl β-(3-chloro-5-nitro-4-cycloheptylphenyl)lactate
ethyl β-[3-chloro-5-nitro-4-(2'-methylcycloheptyl)phenyl]lactate
ethyl β-[3-chloro-5-nitro-4-(2'-methylcyclohexyl)phenyl]lactate
ethyl β-[3-chloro-5-nitro-4-(3'-methylcyclohexyl)phenyl]lactate
ethyl β-[3-chloro-5-nitro-4-(4'-methylcyclohexyl)phenyl]acetate
ethyl β-(3-chloro-5-nitro-4-cyclohexylphenyl)lactate
ethyl β-(3-bromo-5-nitro-4-cyclopentylphenyl)lactate
ethyl β-[3-bromo-5-nitro-4-(2'-methylcyclopentyl)phenyl]lactate
ethyl β-(3-bromo-5-nitro-4-cycloheptylphenyl)lactate
ethyl β-[3-bromo-5-nitro-4-(2'-methylcyclohexyl)phenyl]lactate
ethyl β-[3-bromo-5-nitro-4-(3'-methylcyclohexyl)phenyl]lactate
ethyl β-[3-bromo-5-nitro-4-(4'-methylcyclohexyl)phenyl]lactate
ethyl β-(3,5-dinitro-4-cyclopentylphenyl)lactate
ethyl β-[3,5-dinitro-4-(2'-methylcyclopentyl)phenyl]lactate
ethyl β-(3,5-dinitro-4-cycloheptylphenyl)lactate
ethyl β-[3,5-dinitro-4-(2'-methylcycloheptyl)phenyl]lactate
ethyl β-[3,5-dinitro-4-(2'-methylcyclohexyl)phenyl]lactate
ethyl β-[3,5-dinitro-4-(3'-methylcyclohexyl)phenyl]lactate
ethyl β-[3,5-dinitro-4-(4'-methylcyclohexyl)phenyl]lactate
ethyl β-(3,5-dinitro-4-cyclohexylphenyl)lactate

EXAMPLE 15

Ethyl β-(3-trifluoromethyl-4-cyclohexylphenyl)lactate

To a solution of 0.01 moles of ethyl β-(3-bromo-4-cyclohexylphenyl)-lactate in 50 ml. of dimethylformamide is added 0.15 moles of trifluoromethyl iodide and 0.02 g. of copper powder. The reaction is shaken in a sealed tube for 5 hours at 140°C, cooled, and then filtered and evaporated in vacuo. 200 ml. of water is added to the residue and extracted with ether. The ether extract is dried, evaporated to dryness and distilled to obtain ethyl β-(3-trifluoromethyl-4-cyclohexylphenyl)lactate.

When ethyl β-(3-bromo-4-cyclohexylphenyl)lactate in the above example is replaced by equimolar amounts of the bromo compounds of this invention, then the corresponding trifluoromethyl product is obtained.

EXAMPLE 16

Ethyl β-(3-amino-4-cyclohexylphenyl)lactate

A mixture of 16.1 g. (0.05 moles) of ethyl β-(3-nitro-4-cyclohexylphenyl)lactate in 100 ml. methanol containing 0.05 mole citric acid and 1.5 g. of 5% palladium-on-carbon is shaken with hydrogen at 3 atm. pressure and 27°C until 3 moles of hydrogen are absorbed. The mixture is filtered, washed with methanol and the filtrate concentrated in vacuo to obtain ethyl β-(3-amino-4-cyclohexylphenyl)lactate.

When ethyl β-(3-nitro-4-cyclohexylphenyl)lactate in the above example is replaced by equimolar amounts of the nitro compounds of this invention, then the corresponding products are obtained.

EXAMPLE 17

Ethyl β-(3-methylamino-4-cyclohexylphenyl)lactate

To a solution of 0.01 moles of ethyl β-(3-amino-4-cyclohexylphenyl)-lactate in 100 ml. of pyridine is added 0.1 moles of methyl iodide. The reaction mixture is stirred overnight at room temperature, filtered and concentrated. The residue is distilled to obtain ethyl β-(3-methylamino-4-cyclohexylphenyl)lactate.

When ethyl β-(3-amino-4-cyclohexylphenyl)lactate in the above example is replaced by equimolar amounts of the amino compounds of this invention, then the corresponding products are obtained.

When 0.01 moles of acetyl chloride is used in place of methyl iodide in the above example, then the product prepared is ethyl β-(3-acetylamino-4-cyclohexylphenyl)lactate.

EXAMPLE 18

Ethyl β-(3-dimethylamino-4-cyclohexylphenyl)lactate

A solution of 0.005 moles of ethyl β-(3-nitro-4-cyclohexylphenyl)-lactate and 1.6 ml. of 37% formaldehyde in 50 ml. of methanol is shaken with hydrogen over 0.5 g. of 5% palladium-on-charcoal at 42 lbs. and 7°C until five moles of hydrogen are absorbed. The catalyst is filtered off and the filtrate is evaporated in vacuo. The residue is then distilled to obtain ethyl β-(3-dimethylamino-4-cyclohexylphenyl)lactate.

When ethyl β-(3-nitro-4-cyclohexylphenyl)lactate in the above example is replaced by equimolar amounts of the nitro compounds of this invention, then the corresponding products are obtained.

EXAMPLE 19

Ethyl β-(3-cyano-4-cyclohexylphenyl)lactate

To 29.1 g. (0.1 moles) of ethyl β-(3-amino-4-cyclohexylphenyl)-lactate in 35 ml. of 28% hydrochloric acid and 100 ml. of cracked ice to maintain the temperature at 0°C is added a solution of 7.1 g. (0.102 moles) of sodium nitrite in 20 ml. of water. The reaction mixture is then neutralized with sodium carbonate. The diazonium mixture is added to a cuprous cyanide solution (prepared from 31.5 g. of copper sulfate and 6.2 g. of sodium cyanide in 75 ml. of water). 250 ml. of toluene is also added and the mixture is stirred for 1 hour. The reaction is then allowed to stir an additional 2 hours while warming gradually to 50°C. This is then cooled and the toluene separated, dried over sodium sulfate and evaporated to dryness to obtain ethyl β-(3-cyano-4-cyclohexylphenyl)lactate.

When ethyl β-(3-amino-4-cyclohexylphenyl)lactate in the above example is replaced by equimolar amounts of the amino compounds of this invention, then the corresponding products are obtained.

EXAMPLE 20

Ethyl β-(3-fluoro-4-cyclohexylphenyl)lactate

To 43.7 g. (0.15 moles) of ethyl β-(3-amino-4-cyclohexylphenyl)-lactate is added at 0°C 44 ml. of 1.5 moles of concentrated hydrochloric acid. The reaction mixture is maintained at 0°C and the diazonium salt is prepared with 23.2 g. (0.32 moles) of 95% sodium nitrite in 80 ml. of water. To this mixture is rapidly added a solution of 10.4 g. (0.17 moles) of boric acid dissolved in 22 g. (0.66 moles) of 60% hydrofluoric acid. The reaction mixture is then stirred for ½ hour and filtered, washed with 3 × 25 ml. of water, 2 × 25 ml. of ethanol and 25 ml. of ether. The residual cake is then heated in vacuo. The treated cake is then placed in a distilling flask and heated to permit spontaneous decomposition. After the decomposition, the residue is then fractionally distilled to obtain ethyl β-(3-fluoro-4-cyclohexylphenyl)lactate.

When ethyl β-(3-amino-4-cyclohexylphenyl)lactate in the above example is replaced by the amino compounds of this invention, then the corresponding products are obtained.

EXAMPLE 21

β-(3-Hydroxy-4-cyclohexylphenyl)lactic acid

To 4.5 g. of ethyl β-(3-amino-4-cyclohexylphenyl)-lactate suspension in 125 ml. of 80% hydrochloric acid and cooled to 0°C is added dropwise a solution of 1.2 of sodium nitrite in 15 ml. of water. After about 10 min., 200 ml. of 50% hydrochloric acid is added portion wise and stirred for 15 hours. The reaction mixture is then poured onto ice water and extracted with chloroform, dried over sodium sulfate and concentrated in vacuo. The residue is crystallized to obtain β-(3-hydroxy-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are obtained.

EXAMPLE 22

Ethyl β-(3-methoxy-4-cyclohexylphenyl)lactate

To a stirred suspension of 0.01 moles of sodium hydride in 25 ml. of dry dimethylformamide which has been cooled to 0°C is added dropwise a solution of 0.01 moles of ethyl β-(3-hydroxy-4-cyclohexylphenyl)lactate in 10 ml. of dimethylformamide. The reaction mixture is stirred for 15 minutes and 0.015 moles of methyliodide is then added dropwise. The mixture is allowed to stir overnight at room temperature. 200 ml. of water is added and the resulting mixture is extracted well with ether. The ether extract is washed with water, dried over sodium sulfate, evaporated to dryness and distilled to obtain ethyl β-(3-methoxy-4-cyclohexylphenyl)lactate.

When ethyl β-(3-hydroxy-4-cyclohexylphenyl)lactate in the above example is replaced by equimolar amounts of the hydroxy compounds of this invention, then the corresponding products are obtained.

When 0.01 moles of acetyl chloride is used in place of methyliodide in the above reaction, then the product prepared is ethyl β-(3-acetyloxy-4-cyclohexylphenyl)-lactate.

EXAMPLE 23

β-(3-Bromo-4-cyclohexylphenyl)lactic acid

To 11.5 g. (0.044 moles) of ethyl β-(3-amino-4-cyclohexylphenyl)lactate suspension in 225 ml. of 40% hydrobromic acid and cooled to 0°C is added dropwise a solution of 2.34 g. of sodium nitrite in 30 ml. of water. To this mixture is added a solution of 20 g. of cuprous bromide in 350 ml. of 40% hydrobromic acid added portion wise and stirred for 15 hours. The reaction mixture is then poured onto ice water, extracted with chloroform, dried over sodium sulfate and concentrated in vacuo. The residue is then crystallized to obtain β-(3-bromo-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by the amino compounds of this invention, then the corresponding products are obtained.

EXAMPLE 24

β-(3-Iodo-4-cyclohexylphenyl)lactic acid

To .05 moles of ethyl β-(3-amino-4-cyclohexylphenyl)lactate dissolved in a mixture of 50 g. of ice water and 0.06 moles of concentrated sulfuric acid at 0°C is added a solution of 0.05 moles of 95% sodium nitrite in 8 ml. of water. Stirring is continued for ½ hour and then 1.5 ml. of concentrated sulfuric acid is added. This solution is poured into an ice cold solution of 0.06 moles of potassium iodide in 10 ml. of water. To this is added 0.075 g. copper bronze with stirring and the solution is warmed slowly on a water bath to about 80°C for 2 hours. After cooling to room temperature the reaction mixture is extracted thrice with 15 ml. portions of chloroform. This is then washed with dilute thiosulfate solution, water, dried over sodium sulfate and evaporated in vacuo. The residue is crystallized to obtain β-(3-iodo-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are obtained.

EXAMPLE 25

β-(3-Mercapto-4-cyclohexylphenyl)lactic acid

To 17.3 g. of ethyl β-(3-amino-4-cyclohexylphenyl)lactate in 11.1 ml. of concentrated hydrochloric acid and 20 g. of ice is added 4.1 g. of sodium nitrite in 2 ml. of water. This mixture is stirred for 10 min. and then added gradually to an ice cold solution of 10.3 g. of potassium ethyl xanthate in 14 ml. of water. The reaction is gradually heated over 45 minutes to 50°C and stirred an additional 45 minutes. The mixture is then cooled, extracted with ether which is then washed with water, dilute sodium hydroxide and water, dried over sodium sulfate and evaporated in vacuo. The residue is dissolved in 35 ml. of boiling ethanol to which is added gradually 13 g. of potassium hydroxide. The reaction is refluxed an additional hour and then evaporated to dryness in vacuo. The residue is dissolved in water and extracted with ether. The alkaline phase is acidified with 6N sulfuric acid and extracted with ether. The ether is washed with water, dried over sodium sulfate and evaporated to dryness to obtain β-(3-mercapto-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are prepared.

EXAMPLE 26

Ethyl β-(3-methylthio-4-cyclohexylphenyl)lactate

To 3.85 g. of ethyl β-(3-mercapto-4-cyclohexylphenyl)lactate in 40 ml. of water containing 0.65 g. of sodium hydroxide is added 2 ml. of dimethyl sulfate with stirring. The reaction mixture is gradually warmed to 40°C and stirred for 2 hours. The mixture is cooled and extracted with ether which is washed with water, dried and evaporated in vacuo. The residue is distilled to obtain ethyl β-(3-methylthio-4-cyclohexylphenyl)lactate.

When the above β-(3-methylthio-4-cyclohexylphenyl)lactate is treated with 30% $H_2O_2$, then the resultant product is ethyl β-(3-methyl-sulfinyl-4-cyclohexylphenyl)lactate or ethyl β-(3-methylsulfonyl-4-cyclohexylphenyl)lactate.

When ethyl β-(3-mercapto-4-cyclohexylphenyl)lactate in the above example is replaced by the mercapto compounds of this invention, then the corresponding products are prepared.

When a equimolar amount of acetyl chloride is used in place of dimethyl sulfate in the above reaction, then the product prepared is ethyl β-(3-acetylthio-4-cyclohexylphenyl)lactate.

EXAMPLE 27

Ethyl β-(3-nitro-5-trifluoromethyl-4-cyclohexylphenyl)lactate

To a solution of 0.01 moles of ethyl β-(3-bromo-5-nitro-4-cyclohexylphenyl)lactate in 50 ml. of dimethylformamide is added 0.15 moles of trifluoromethyl iodide and 0.02 g. of copper powder. The reaction is shaken in a sealed tube for 5 hours at 140°C, cooled, filtered and evaporated in vacuo. 200 ml. of water is added to the residue and extracted with ether. The ether extract is dried, evaporated to dryness and distilled to obtain ethyl β-(3-nitro-5-trifluoromethyl-4-cyclohexylphenyl)lactate.

When ethyl β-(3-bromo-5-nitro-4-cyclohexylphenyl)lactate in the above reaction is replaced by ethyl β-(3-bromo-5-fluoro-4-cyclohexylphenyl)lactate or ethyl β-(3-bromo-5-chloro-4-cyclohexyphenyl)lactate, then the products obtained are ethyl β-(3-fluoro-5-trifluoromethyl-4-cyclohexylphenyl)lactate and ethyl β-(3-chloro-5-trifluoromethyl-4-cyclohexylphenyl)lactate.

EXAMPLE 28

Ethyl β-(3-amino-5-nitro-4-cyclohexylphenyl)lactate

A mixture of 17.6 g. (0.05 moles) of ethyl β-(3,5-dinitro-4-cyclohexylphenyl)lactate in 100 ml. of methanol containing 0.05 moles of citric acid and 1.5 g. of 5% palladium-on-carbon is shaken with hydrogen at 3 atm. pressure and 27°C until 3 moles of hydrogen are absorbed. The mixture is filtered, washed with methanol and the filtrate concentrated in vacuo to obtain ethyl β-(3-amino-5-nitro-4-cyclohexylphenyl)lactate isolated as the citrate salt.

When ethyl β-(3,5-dinitro-4-cyclohexylphenyl)lactate in the above example is replaced by ethyl β-(3-chloro-5-nitro-4-cyclohexylphenyl)lactate, ethyl β-(3-bromo-5-nitro-4-cyclohexylphenyl)lactate, ethyl β-(3-fluoro-5-nitro-4-cyclohexylphenyl)lactate or ethyl β-(3-trifluoromethyl-5-nitro-4-cyclohexylphenyl)lactate, then the products obtained are ethyl β-(3-amino-5-chloro-4-cyclohexylphenyl)lactate, ethyl β-(3-amino-5-bromo-4-cyclohexylphenyl)lactate, ethyl β-(3-amino-5-fluoro-4-cyclohexylphenyl)lactate and ethyl β-(3-amino-5-trifluoromethyl-4-cyclohexylphenyl)lactate.

EXAMPLE 29

When the procedures of Examples 1–28 are followed using the appropriate starting material, then the corresponding product is obtained.

| STARTING MATERIAL | PRODUCT | EXAMPLE |
|---|---|---|
| ethyl β-(3-amino-5-bromo-4-cyclohexylphenyl)lactate | ethyl β-(3-cyano-5-bromo-4-cyclohexylphenyl)lactate | 19 |
| ethyl β-(3-trifluoromethyl-4-cyclohexylphenyl)lactate | ethyl β-(3-trifluoromethyl-5-chloro-4-cyclohexylphenyl)lactate | 10 |
| ethyl β-(3-amino-5-nitro-4-cyclohexylphenyl)lactate | ethyl β-(3-methylthio-5-nitro-4-cyclohexylphenyl)lactate | 26 |
| ethyl β-(3-amino-5-fluoro-4-cyclohexylphenyl)lactate | ethyl β-(3-iodo-5-fluoro-4-cyclohexylphenyl)lactate | 24 |
| ethyl β-(3-amino-5-chloro-4-cyclohexylphenyl)lactate | ethyl β-(3-methoxy-5-chloro-4-cyclohexylphenyl)lactate | 22 |
| ethyl β-(3-amino-5-trifluoromethyl-4-cyclohexylphenyl)lactate | ethyl β-(3-hydroxy-5-trifluoromethyl-4-cyclohexylphenyl)lactate | 21 |
| ethyl β-(3-amino-5-fluoro-4-cyclohexyl-phenyl)lactate | ethyl β-(3,5-difluoro-4-cyclohexylphenyl)lactate | 20 |
| ethyl β-(3-nitro-5-fluoro-4-cyclohexylphenyl)lactate | ethyl β-(3-dimethylamino-5-fluoro-4-cyclohexylphenyl)lactate | 18 |
| ethyl β-(3-amino-5-chloro-4-cyclohexylphenyl)lactate | ethyl β-(3-methylamino-5-chloro-4-cyclohexylphenyl)lactate | 17 |
| ethyl β-(3-amino-5-nitro-4-cyclohexylphenyl)lactate | ethyl β-(3-mercapto-5-nitro-4-cyclohexylphenyl)lactate | 25 |
| ethyl β-(3-amino-5-methylsulfonyl-4-cyclohexylphenyl)lactate | ethyl β-(3-methylsulfonyl-5-nitro-4-cyclohexylphenyl)lactate | 25,26 |
| ethyl β-(3-nitro-5-trifluoromethyl-4-cyclohexylphenyl)lactate | ethyl β-(3-amino-5-trifluoromethyl-4-cyclohexylphenyl)lactate | 16 |
| ethyl β-(3-amino-5-trifluoromethyl-4-cyclohexyl)phenyl)lactate | ethyl β-(3-trifluoromethyl-5-methylsulfonyl-4-cyclohexylphenyl)lactate | 25,26 |
| ethyl β-(3-amino-5-trifluoromethyl-4-cyclohexylphenyl)lactate | ethyl β-(3-fluoro-5-trifluoromethyl-4-cyclohexylphenyl)lactate | 20 |
| ethyl β-(3,5-diamino-4-cyclohexylphenyl)lactate | ethyl β-(3,5-diiodo-4-cyclohexylphenyl)lactate | 24 |
| ethyl β-(3-amino-5-nitro-4-cyclohexylphenyl)lactate | ethyl β-(3-carbamyl-5-nitro-4-cyclohexylphenyl)lactate | 19 |
| ethyl β-(3-amino-5-nitro-4-cyclohexylphenyl)lactate | ethyl β-(3-carbethoxy-5-nitro-4-cyclohexylphenyl)lactate | 19 |
| ethyl β-(3-amino-5-nitro-4-cyclohexylphenyl)lactate | ethyl β-(3-carboxy-5-nitro-4-cyclohexylphenyl)lactate | 19 |
| ethyl β-(3-mercapto-5-nitro-4-cyclohexylphenyl)lactate | ethyl β-(3-methylsulfinyl-5-nitro-4-cyclohexylphenyl)lactate | 26 |
| ethyl β-(3-amino-5-bromo-4-cyclohexylphenyl)lactate | ethyl β-(3-methylsulfonyl-5-bromo-4-cyclohexylphenyl)lactate | 25,26 |
| ethyl β-(3-fluoro-4-cyclohexylphenyl)lactate | ethyl β-(3-nitro-5-fluoro-4-cyclohexylphenyl)lactate | 13 |
| ethyl β-(3-fluoro-4-cyclohexylphenyl)lactate | ethyl β-(3-bromo-5-fluoro-4-cyclohexylphenyl)lactate | 12 |
| ethyl β-(3-methylsulfonyl-4-cyclohexylphenyl)lactate | ethyl β-(3-chloro-methtylsulfonyl-4-cyclohexylphenyl)lactate | 10 |
| ethyl β-(3-amino-5-nitro-4-cyclohexylphenyl)lactate | ethyl β-(3-cyano-5-nitro-4-cyclohexylphenyl)lactate | 19 |
| ethyl β-(3-amino-5-trifluoromethyl-4-cyclohexylphenyl)lactate | ethyl β-(3-trifluoromethyl-5-iodo-4-cyclohexylphenyl)lactate | 24 |
| ethyl β-(3-iodo-4-cyclohexylphenyl)lactate | ethyl β-(3-amino-5-iodo-4-cyclohexylphenyl)lactate | 13,16 |
| ethyl β-(3-fluoro-4-cyclohexylphenyl)lactate | ethyl β-(3-chloro-5-fluoro-4-cyclohexylphenyl)lactate | 10 |
| ethyl β-(3,5-dinitro-4-cyclohexylphenyl)lactate | ethyl β-(3-acetylamino-5-nitro-4-cyclohexylphenyl)lactate | 28,17 |
| ethyl β-(3-amino-5-chloro-4-cyclohexylphenyl)lactate | ethyl β-(3-acetyloxy-5-chloro-4-cyclohexylphenyl)lactate | 21,22 |
| ethyl β-(3-amino-5-nitro-4-cyclohexylphenyl)lactate | ethyl β-(3-acetylthio-5-nitro-4-cyclohexylphenyl)lactate | 25,26 |
| ethyl β-(3-nitro-5-bromo-4-cyclohexylphenyl)lactate | ethyl β-(3,5-ditrifluoromethyl-4-cyclohexylphenyl)lactate | 27,16,23,15 |
| ethyl β-[3-fluoro-4-(2'-methylcyclohexyl)phenyl] lactate | ethyl β[3-nitro-5-fluoro-4-(2'-methylcyclohexyl)phenyl]lactate | 13 |
| ethyl β-[3-bromo-5-nitro-4-(2'-methylcyclohexyl)phenyl]lactate | ethyl β-[3-nitro-5-trifluoromethyl-4-(2'-methylcyclohexyl)phenyl]lactate | 15 |
| ethyl β-[3-fluoro-4-(2'-methylcyclohexyl)phenyl]lactate | ethyl β-[3-chloro-5-fluoro-4-(2'-methylcyclohexyl)phenyl]lactate | 10 |
| ethyl β-[3-amino-5-fluoro-4-(2'-methylcyclohexyl)phenyl]lactate | ethyl β-[3-fluoro-5-bromo-4-(2'-methylcyclohexyl)phenyl]lactate | 23 |
| ethyl β-[3-cyano-4-(2'-methylcyclohexyl)phenyl]lactate | ethyl β-[3-cyano-5-chloro-4-(2'-methylcyclohexyl)phenyl]lactate | 10 |
| ethyl β-[3,5-dinitro-4-(2'-methylcyclohexyl)phenyl]lactate | ethyl β-[3-amino-5-nitro-4-(2'-methylcyclohexyl)phenyl]lactate | 28 |
| ethyl β-[3,5-dinitro-4-(3'-methylcyclohexyl)phenyl]lactate | ethyl β-[3-amino-5-nitro-4-(3'-methylcyclohexyl)phenyl]lactate | 28 |
| ethyl β-[3,5-dinitro-4-(4'-methylcyclohexyl)phenyl]lactate | ethyl β[3-amino-5-nitro-4-(4'-methylcyclohexyl)phenyl]lactate | 28 |
| ethyl β-[3-chloro-5-bromo-4-(4'-methylcyclohexylphenyl]lactate | ethyl β-[3-chloro-5-trifluoromethyl-4-(4'-methylcyclohexyl)phenyl]lactate | 15 |
| ethyl β-[3-chloro-4-(4'-methylcyclohexyl)phenyl]lactate | ethyl β-[3-bromo-5-chloro-4-(4'-methylcyclohexyl)phenyl]lactate | 12 |
| ethyl β-[3-amino-5-trifluoromethyl-4-(4'-methylcyclohexyl)phenyl]lactate | ethyl β-[3-trifluoromethyl-5-fluoro-4-(4'-methylcyclohexyl)phenyl]lactate | 20 |
| ethyl β-[p-(4'-methylcyclohexyl)phenyl]lactate | ethyl β-[3,5-dichloro-4-(4'-methylcyclohexyl)phenyl]lactate | 11 |
| ethyl β-[3-chloro-4-(4'-methylcyclohexyl)phenyl]lactate | ethyl β[3-nitro-5-chloro-4-(4'-methylcyclohexyl)phenyl]lactate | 13 |
| ethyl β-[3-chloro-4-(2'-methylcyclohexyl)phenyl]lactate | ethyl β-[3-nitro-5-chloro-4-(2'-methylcyclohexyl)phenyl]lactate | 13 |
| ethyl β-[p-(4'-methylcyclohexyl)phenyl]lactate | ethyl β-[3,5-dinitro-4-(4'-methylcyclohexyl)phenyl]lactate | 14 |
| ethyl β-[3-chloro-4-(4'-methylcyclohexyl)phenyl]lactate | ethyl β-[3,5-dichloro-4-(4'-methylcyclohexyl)phenyl]lactate | 10 |
| ethyl β-(p-cyclohexylphenyl)lactate | ethyl β-(3-methyl-4-cyclohexylphenyl)lactate | 9 |
| ethyl β-(3-methyl-4-cyclohexylphenyl)lactate | ethyl β-(3-chloro-5-methyl-4-cyclohexylphenyl)lactate | 10 |
| ethyl β-(3-methyl-4-cyclohexylphenyl)lactate | ethyl β-(3-nitro-5-methyl-4-cyclohexylphenyl)lactate | 11 |
| ethyl β-(3-methyl-5-nitro-4-cyclohexylphenyl)lactate | ethyl β-(3-amino-5-methyl-4-cyclohexylphenyl)lactate | 16 |
| ethyl β-(3-methyl-4-cyclohexylphenyl)lactate | ethyl β-(3-bromo-5-methyl-4-cyclohexylphenyl)lactate | 12 |
| ethyl β-(3-bromo-5-methyl-4-cyclohexylphenyl)lactate | ethyl β-(3-methyl-5-trifluoromethyl-4-cyclohexylphenyl)lactate | 15 |
| ethyl β-(3-amino-5-methyl-4-cyclohexylphenyl)lactate | ethyl β-(3-fluoro-5-methyl-4-cyclohexylphenyl)lactate | 20 |
| ethyl β-[p-(2'-methylcyclohexyl)phenyl]lactate | ethyl β-(3,2'-dimethyl-4-cyclohexylphenyl)lactate | 9 |
| ethyl β-(3,2'-dimethyl-4-cyclohexylphenyl)lactate | ethyl β-(3,2'-dimethyl-5-nitro-4-cyclohexylphenyl)lactate | 11 |

EXAMPLE 30

Ethyl α-methyl-β-(3-chloro-4-cyclohexylphenyl)lactate

A solution of methylmagnesium iodide is prepared from 6.7 g. (0.047 mole) of methyl iodide, 1.24 g. (0.051 g-atom) of magnesium turnings, and 40 ml. of anhydrous ether. This solution is added over a period of 1 hour to a solution of 15 g. (0.0508 mole) of ethyl β-(3-chloro-4-cyclohexylphenyl)pyruvate. The addition is carried out with vigorous stirring at 0° to 5°C. The red-brown solution is then allowed to stand at room temperature overnight. The mixture is poured into an ice-cold solution of 0.2 M-sulfuric acid. The ether layer is separated, extracted with 3 × 70 ml. of 1% sulfuric acid, dried over magnesium sulfate, filtered and evaporated to obtain ethyl α-methyl-β-(3-chloro-4-cyclohexylphenyl)lactate.

EXAMPLE 31

When ethyl β-(3-chloro-4-cyclohexylphenyl)pyruvate is replaced by ethyl β-(3,5-dichloro-4-cyclohexylphenyl)pyruvate, then the product prepared is ethyl α-methyl-β-(3-dichloro-4-cyclohexylphenyl)lactate.

EXAMPLE 32

When the procedure of Examples 30–31 is followed but the Grignard reagent used is ethylmagnesium iodide, propylmagnesium iodide or butylmagnesium iodide, then the product prepared is
- ethyl α-ethyl-β-(3-chloro-4-cyclohexylphenyl)lactate
- ethyl α-propyl-β-(3-chloro-4-cyclohexylphenyl)lactate
- ethyl α-butyl-β-(3-chloro-4-cyclohexylphenyl)lactate
- ethyl α-ethyl-β-(3,5-dichloro-4-cyclohexylphenyl)lactate
- ethyl α-propyl-β-(3,5-dichloro-4-cyclohexylphenyl)lactate
- ethyl α-butyl-β-(3,5-dichloro-4-cyclohexylphenyl)lactate

EXAMPLE 33

Ethyl α-methyl-β-(3-nitro-4-cyclohexylphenyl)lactate

A solution of 0.05 moles of methylmagnesium iodide in 50 ml. of anhydrous ether is added over a period of 1 hour to a solution of 0.05 moles of ethyl-β-(3-nitro-4-cyclohexylphenyl)pyruvate at 0°C. The reaction mixture is allowed to stand and warm gradually to room temperature over 10 hours, poured over ice-cold solution of 0.2 M sulfuric acid. The organic layer is separated, extracted with 1% sulfuric acid solution, dried over magnesium sulfate and evaporated to obtain ethyl α-methyl-β-(3-nitro-4-cyclohexylphenyl)lactate.

EXAMPLE 34

When ethyl β-(3-chloro-4-cyclohexylphenyl)pyruvate, ethyl β-(3,5-dichloro-4-cyclohexylphenyl)pyruvate or ethyl β-(3-nitro-4-cyclohexylphenyl)pyruvate in Examples 30 to 33 is replaced by an equimolar amount of the pyruvate esters of this invention, then the corresponding lactate product is prepared. A representative list of the compounds prepared is shown in Table I, below.

TABLE I

- ethyl α-methyl-β-(3-methoxy-5-chloro-4-cyclohexylphenyl)lactate
- ethyl α-methyl-β-(3-methyl-5-chloro-4-cyclohexylphenyl)lactate
- ethyl α-methyl-β-(3-bromo-5-chloro-4-cyclohexylphenyl)lactate
- ethyl α-methyl-β-(3-methyl-5-fluoro-4-cyclohexylphenyl)lactate
- ethyl α-methyl-β-(3-methyl-5-bromo-4-cyclohexylphenyl)lactate
- ethyl α-methyl-β-(3-methyl-5-trifluoromethyl-4-cyclohexylphenyl)lactate
- ethyl α-methyl-β-(3-acetyl-5-chloro-4-cyclohexylphenyl)lactate
- ethyl α-methyl-β-(3-methyl-5-nitro-4-cyclohexylphenyl)lactate
- ethyl α-methyl-β-(3,5-difluoro-4-cyclohexylphenyl)lactate
- ethyl α-methyl-β-(3-cyano-5-fluoro-4-cyclohexylphenyl)lactate
- benzyl α-methyl-β-(3-cyano-5-fluoro-4-cyclohexylphenyl)lactate
- ethyl α-methyl-β-(3-bromo-5-fluoro-4-cyclohexylphenyl)lactate ethyl α-methyl-β-(3-acetyl-5-fluoro-4-cyclohexylphenyl)lactate
- ethyl α-methyl-β-(3-cyano-5-bromo-4-cyclohexylphenyl)lactate
- benzyl α-methyl-β-(3-cyano-5-bromo-4-cyclohexylphenyl)lactate
- ethyl α-methyl-β-(3,5-dibromo-4-cyclohexylphenyl)lactate
- ethyl α-methyl-β-(3-acetyl-5-bromo-4-cyclohexylphenyl)lactate
- ethyl α-methyl-β-(3-fluoro-5-trifluoromethyl-4-cyclohexylphenyl)lactate
- ethyl α-methyl-β-(3-cyano-5-trifluoromethyl-4-cyclohexylphenyl)lactate
- ethyl α-methyl-β-(3-dimethylamino-5-trifluoromethyl-4-cyclohexylphenyl)lactate
- ethyl α-methyl-β-(3-bromo-5-trifluoromethyl-4-cyclohexylphenyl)lactate
- ethyl α-methyl-β-(3-hydroxy-5-trifluoromethyl-4-cyclohexylphenyl)lactate
- ethyl α-methyl-β-(3-acetyl-5-trifluoromethyl-4-cyclohexylphenyl)lactate
- ethyl α-methyl-β-(3,5-ditrifluoromethyl-4-cyclohexylphenyl)lactate
- ethyl α-methyl-β-(3-chloro-4-cyclopentylphenyl)lactate
- ethyl α-methyl-β-(3-bromo-4-cyclopentylphenyl)lactate
- ethyl α-methyl-β-(3-chloro-4-cycloheptylphenyl)lactate
- ethyl α-methyl-β-(3-bromo-4-cycloheptylphenyl)lactate
- ethyl α-methyl-β-(3-cyano-4-cyclohexylphenyl)lactate
- benzyl α-methyl-β-(3-cyano-4-cyclohexylphenyl)lactate
- ethyl α-methyl-β-(3-trifluoromethyl-4-cyclohexylphenyl)lactate
- ethyl α-methyl-β-(3-amino-4-cyclohexylphenyl)lactate
- ethyl α-methyl-β-(3-methylamino-4-cyclohexylphenyl)lactate
- ethyl α-methyl-β-(3-dimethylamino-4-cyclohexylphenyl)lactate
- ethyl α-methyl-β-(3-fluoro-4-cyclohexylphenyl)lactate
- ethyl α-methyl-β-(3-hydroxy-4-cyclohexylphenyl)lactate
- ethyl α-methyl-β-(3-methoxy-4-cyclohexylphenyl)lactate
- ethyl α-methyl-β-(3-bromo-4-cyclohexylphenyl)lactate
- ethyl α-methyl-β-(3-acetyl-4-cyclohexylphenyl)lactate
- ethyl α-methyl-β-(3,2'-dimethyl-4-cyclohexylphenyl)lactate
- ethyl α-methyl-β-(3-methyl-4-cyclohexylphenyl)lactate
- ethyl α-methyl-β-(3-amino-5-methyl-4-cyclohexylphenyl)lactate
- ethyl α-methyl-β-(3-amino-5-fluoro-4-cyclohexylphenyl)lactate ethyl α-methyl-β-(3-amino-5-chloro-4-cyclohexylphenyl)lactate
ethyl α-methyl-β-(3-amino-5-bromo-4-cyclohexylphenyl)lactate
ethyl α-methyl-β-(3-amino-5-trifluoromethyl-4-cyclohexylphenyl)lactate
ethyl α-methyl-β-(3-amino-5-cyano-4-cyclohexylphenyl)lactate
ethyl α-methyl-β-(3-methylamino-5-chloro-4-cyclohexylphenyl)lactate
ethyl α-methyl-β-(3-dimethylamino-5-chloro-4-cyclohexylphenyl)lactate
ethyl α-methyl-β-(3-cyano-5-chloro-4-cyclohexylphenyl)lactate
benzyl α-methyl-β-(3-cyano-5-chloro-4-cyclohexylphenyl)lactate
ethyl α-methyl-β-(3-fluoro-5-chloro-4-cyclohexylphenyl)lactate
ethyl α-methyl-β-(3-trifluoro-5-chloro-4-cyclohexylphenyl)lactate
ethyl α-methyl-β-(3-hydroxy-5-chloro-4-cyclohexylphenyl)lactate
ethyl α-methyl-β-(3,5-dichloro-4-cyclopentylphenyl)lactate
ethyl α-methyl-β-(3,5-dichloro-4-cycloheptylphenyl)lactate
methyl α-methyl-β-(3-chloro-4-cyclohexylphenyl)lactate
methyl α-methyl-β-(3,5-dichloro-4-cyclohexylphenyl)lactate
propyl α-methyl-β-(3,5-dichloro-4-cyclohexylphenyl)lactate
i-propyl α-methyl-β-(3-chloro-4-cyclohexylphenyl)lactate
i-propyl α-methyl-β-(3,5-dichloro-4-cyclohexylphenyl)lactate
t-butyl α-methyl-β-(3-chloro-4-cyclohexylphenyl)lactate
t-butyl α-methyl-β-(3,5-dichloro-4-cyclohexylphenyl)lactate
ethyl α-methyl-β-[3-chloro-4-(2'-methylcyclopentyl)phenyl]lactate
ethyl α-methyl-β-[3,5-dichloro-4-(2'-methylcyclopentyl)phenyl]lactate
ethyl α-methyl-β-[3-chloro-4-(2'-methylcyclohexyl)phenyl]lactate
ethyl α-methyl-β-[3,5-dichloro-4-(2'-methylcyclohexyl)phenyl]lactate
ethyl α-methyl-β-[3-chloro-4-(2'-methylcycloheptyl)phenyl]lactate
ethyl α-methyl-β-[3,5-dichloro-4-(2'-methylcycloheptyl)phenyl]lactate
ethyl α-methyl-β-[3-chloro-4-(3'-methylcyclohexyl)phenyl]lactate
ethyl α-methyl-β-[3,5-dichloro-4-(3'-methylcyclohexyl)phenyl]lactate
ethyl α-methyl-β-[3-chloro-4-(4'-methylcyclohexyl)phenyl]acetate
ethyl α-methyl-β-[3,5-dichloro-4-(4'-methylcyclohexyl)phenyl]lactate
ethyl α-methyl-β-[3-chloro-5-fluoro-(2'-methylcyclohexyl)phenyl]lactate
ethyl α-methyl-β-[3-fluoro-5-bromo-(2'-methylcyclohexyl)phenyl]lactate
ethyl α-methyl-β-[3-cyano-5-chloro-(2'-methylcyclohexyl)phenyl]lactate
ethyl α-methyl-β-[3-chloro-5-trifluoromethyl-(4'-methylcyclohexyl)-phenyl]lactate
ethyl α-methyl-β-[3-bromo-5-chloro-(4'-methylcyclohexyl)phenyl]lactate
ethyl α-methyl-β-[3-fluoro-5-trifluoromethyl-(4'-methylcyclohexyl)phenyl]lactate
ethyl α-methyl-β-[3,5-dichloro-(4'-methylcyclohexyl)phenyl]lactate
ethyl α-ethyl-β-(3-trifluoromethyl-4-cyclohexylphenyl)lactate
ethyl α-propyl-β-(3-trifluoromethyl-4-cyclohexylphenyl)lactate
ethyl α-butyl-β-(3-trifluoromethyl-4-cyclohexylphenyl)lactate
ethyl α-methyl-β-(3-nitro-4-cyclopentylphenyl)lactate
ethyl α-methyl)-β-(3-nitro-4-cycloheptylphenyl)lactate
ethyl α-methyl-β-(3,5-dinitro-4-cyclohexylphenyl)lactate
ethyl α-methyl-β-(3,5-dinitro-4-cyclopentylphenyl)lactate
ethyl α-methyl-β-(3,5-dinitro-4-cycloheptylphenyl)lactate
ethyl α-methyl-β-(3-nitro-5-chloro-4-cyclohexylphenyl)lactate
ethyl α-methyl-β-(3-cyano-5-nitro-4-cyclohexylphenyl)lactate
benzyl α-methyl-β-(3-cyano-5-nitro-4-cyclohexylphenyl)lactate
ethyl α-methyl-β-(3-amino-5-nitro-4-cyclohexylphenyl)lactate
ethyl α-methyl-β-(3-dimethylamino-5-nitro-4-cyclohexylphenyl)lactate
ethyl α-methyl-β-(3-fluoro-5-nitro-4-cyclohexylphenyl)lactate
ethyl α-methyl-β-(3-hydroxy-5-nitro-4-cyclohexylphenyl)lactate
ethyl α-methyl-β-(3-methoxy-5-nitro-4-cyclohexylphenyl)lactate
ethyl α-methyl-β-(3-bromo-5-nitro-4-cyclohexylphenyl)lactate
ethyl α-methyl-β-(3-trifluoromethyl-5-nitro-4-cyclohexylphenyl)lactate
ethyl α-methyl-β-(3-iodo-5-nitro-4-cyclohexylphenyl)lactate
ethyl α-methyl-β-(3-mercapto-5-nitro-4-cyclohexylphenyl)lactate
ethyl α-methyl-β-(3-methylthio-5-nitro-4-cyclohexylphenyl)lactate
ethyl α-methyl-β-(3-acetylthio-5-nitro-4-cyclohexylphenyl)lactate
ethyl α-methyl-β-(3-acetyloxy-5-nitro-4-cyclohexylphenyl)lactate
ethyl α-methyl-β-(3-acetylamino-5-nitro-4-cyclohexylphenyl)lactate
ethyl α-methyl-β-(3-methylsulfonyl-5-nitro-4-cyclohexylphenyl)lactate
ethyl α-methyl-β-(3-amino-5-iodo-4-cyclohexylphenyl)lactate
ethyl α-methyl-β-(3-amino-5-methylsulfonyl-4-cyclohexylphenyl)lactate
ethyl α-methyl-β-(3-trifluoromethyl-5-methylsulfonyl-4-cyclohexylphenyl)lactate
ethyl α-methyl-β-(3-nitro-5-methylsulfinyl-4-cyclohexylphenyl)lactate ethyl α-methyl-β-(3-bromo-5-methylsulfinyl-4-cyclohexylphenyl)lactate
ethyl α-methyl-β-(3-chloro-5methylsulfinyl-4-cyclohexylphenyl)lactate
ethyl α-methyl-β-(3-methylsulfinyl-4-cyclohexylphenyl)lactate
ethyl α-methyl-β-(3-methylsulfonyl-4-cyclohexylphenyl)lactate
ethyl α-methyl-β-(3-iodo-4-cyclohexylphenyl)lactate
ethyl α-methyl-β-(3-mercapto-4-cyclohexylphenyl)lactate
ethyl α-methyl-β-(3-iodo-5-chloro-4-cyclohexylphenyl)lactate
ethyl α-methyl-β-(3-mercapto-5-chloro-4-cyclohexylphenyl)lactate
ethyl α-methyl-β-(3-iodo-5-fluoro-4-cyclohexylphenyl)lactate
ethyl α-methyl-β-(3-mercapto-5-fluoro-4-cyclohexylphenyl)lactate
ethyl α-methyl-β-(3-iodo-5-bromo-4-cyclohexylphenyl)lactate
ethyl α-methyl-β-(3-iodo-5-acetyl-4-cyclohexylphenyl)lactate
ethyl α-methyl-β-(3-iodo-5-methylsulfonyl-4-cyclohexylphenyl)lactate
ethyl α-methyl-β-[3-nitro-4-(2'-methylcyclopentyl)phenyl]lactate
ethyl α-methyl-β-[3-nitro-4-(2'-methylcyclohexyl)phenyl]lactate
ethyl α-methyl-β-[3-nitro-4-(2'-methylcycloheptyl)phenyl]lactate
ethyl α-methyl-β-[3-nitro-4-(3'-methylcyclohexyl)phenyl]lactate
ethyl α-methyl-β-[3-nitro-4-(4'-methylcyclohexyl)phenyl]lactate
ethyl α-methyl-β-[3-amino-5-nitro-4(2'-methylcyclohexyl)phenyl]lactate
ethyl α-methyl-β-[3-amino-5-nitro-4-(3'-methylcyclohexyl)phenyl]lactate
ethyl α-methyl-β-[3-amino-5-nitro-4-(4'-methylcyclohexyl)phenyl]lactate
ethyl α-methyl-β-[3,5-dinitro-4(4'-methylcyclohexyl)phenyl]lactate

EXAMPLE 35

β-(3-chloro-4-cyclohexylphenyl)lactic acid

To a solution of 0.144 moles of ethyl β-(3-chloro-4-cyclohexylphenyl)lactate dissolved in 220 ml. of isopropanol is added 38 g. (0.7 mole) of potassium hydroxide. This mixture is then heated at reflux temperature in a nitrogen atmosphere. The solution is concentrated in vacuo to a viscous oil, which is then dissolved in 500 ml. of water and filtered. The filtrate is acidified with 10% HCl and the precipitate is taken up in ether. The ether layer is dried, filtered and the filtrate concentrated to dryness. Recrystallization of residue from benzene-cyclohexane 1:1 gives β-(3-chloro-4-cyclohexylphenyl)lactic acid.

EXAMPLE 36

α-Methyl-β-(3,5-dichloro-4-cyclohexylphenyl)lactic acid

To a solution of 0.15 moles of ethyl α-methyl-β-(3,5-dichloro-4-cyclohexylphenyl)lactate dissolved in 225 ml. of isopropanol is added 40 g. of potassium hydroxide. This mixture is then heated to reflux temperature in a nitrogen atmosphere. The solution is concentrated in vacuo and the residue is dissolved in 500 ml. of water and acidified with 10% HCl. The mixture is extracted with ether, dried and evaporated to dryness. The residue is recrystallized from benzene-cyclohexane to give α-methyl-β-(3,5-dichloro-4-cyclohexylphenyl)lactic acid.

EXAMPLE 37

When an equimolar amount of the lactate compounds of this invention are used in Examples 35–36, then the corresponding lactic acid is prepared. A representative list of compounds so prepared are described below.

Table I

β-(3-chloro-4-cyclopentylphenyl)lactic acid
β-(3-bromo-4-cyclopentylphenyl)lactic acid
β-(3-chloro-4-cycloheptylphenyl)lactic acid
β-(3-bromo-4-cycloheptylphenyl)lactic acid
β-(3-trifluoromethyl-4-cyclohexylphenyl)lactic acid
β-(3-amino-4-cyclohexylphenyl)lactic acid
β-(3-methylamino-4-cyclohexylphenyl)lactic acid
β-(3-dimethylamino-4-cyclohexylphenyl)lactic acid
β-(3-fluoro-4-cyclohexylphenyl)lactic acid
β-(3-hydroxy-4-cyclohexylphenyl)lactic acid
β-(3-methoxy-4-cyclohexylphenyl)lactic acid
β-(3-bromo-4-cyclohexylphenyl)lactic acid
β-(3-acetyl-4-cyclohexylphenyl)lactic acid
β-(3,2'-dimethyl-4-cyclohexylphenyl)lactic acid
β-(3-methyl-4-cyclohexylphenyl)lactic acid
β-(3-amino-5-methyl-4-cyclohexylphenyl)lactic acid
β-(3-amino-5-fluoro-4-cyclohexylphenyl)lactic acid
β-(3-amino-5-chloro-4-cyclohexylphenyl)lactic acid
β-(3-amino-5-bromo-4-cyclohexylphenyl)lactic acid
β-(3-amino-5-trifluoromethyl-4-cyclohexylphenyl)lactic acid
β-(3-amino-5-cyano-4-cyclohexylphenyl)lactic acid
β-(3-methylamino-5-chloro-4-cyclohexylphenyl)lactic acid
β-(3-dimethylamino-5-chloro-4-cyclohexylphenyl)lactic acid
β-(3-fluoro-5-chloro-4-cyclohexylphenyl)lactic acid
β-(3-trifluoromethyl-5-chloro-4-cyclohexylphenyl)lactic acid
β-(3-hydroxy-5-chloro-4-cyclohexylphenyl)lactic acid
β-(3-methoxy-5-chloro-4-cyclohexylphenyl)lactic acid
β-(3-methyl-5-chloro-4-cyclohexylphenyl)lactic acid
β-(3-bromo-5-chloro-4-cyclohexylphenyl)lactic acid
β-(3-methyl-5-fluoro-4-cyclohexylphenyl)lactic acid
β-(3-methyl-5-bromo-4-cyclohexylphenyl)lactic acid
β-(3-methyl-5-trifluoromethyl-4-cyclohexylphenyl)lactic acid
β-(3-acetyl-5-chloro-b 4-cyclohexylphenyl)lactic acid
β-(3-methyl-5-nitro-4-cyclohexylphenyl)lactic acid
β-(3,5-difluoro-4-cyclohexylphenyl)lactic acid
β-(3-bromo-5-fluoro-4-cyclohexylphenyl)lactic acid
β-(3-acetyl-5-fluoro-4-cyclohexylphenyl)lactic acid
β-(3,5-dibromo-4-cyclohexylphenyl)lactic acid
β-(3-acetyl-5-bromo-4-cyclohexylphenyl)lactic acid
β-(3-fluoro-5-trifluoromethyl-4-cyclohexylphenyl)lactic acid
β-(3-carboxy-5-trifluoromethyl-4-cyclohexylphenyl)lactic acid β-(3-dimethylamino-5-trifluoromethyl-4-cyclohexylphenyl)lactic acid
β-(3-bromo-5-trifluoromethyl-4-cyclohexylphenyl)lactic acid
β-(3-hydroxy-5-trifluoromethyl-4-cyclohexylphenyl)lactic acid
β-(3-acetyl-5-trifluoromethyl-4-cyclohexylphenyl)lactic acid
β-(3,5-ditrifluoromethyl-4-cyclohexylphenyl)lactic acid
β-(3-acetyl-5-cyclohexylphenyl)lactic acid
β-(3-chloro-4-cyclohexylphenyl)lactic acid
β-[3-chloro-4-(2'-methylcyclopentyl)phenyl]lactic acid (2 racemates)
β-[3-chloro-4-(2'-methylcyclohexyl)phenyl]lactic acid (2 racemates)
β-[3-chloro-4-(2'-methylcycloheptyl)phenyl]lactic acid (2 racemates)
β-[3-chloro-4-(3'-methylcyclohexyl)phenyl]lactic acid (2 racemates)
β-[3-chloro-4-(4'-methylcyclohexyl)phenyl]lactic acid
β-[3-chloro-5-fluoro-(2'-methylcyclohexyl)phenyl]lactic acid (2 racemates)
β-[3-fluoro-5-bromo-(2'-methylcyclohexyl)phenyl]lactic acid (2 racemates)
β-[3-chloro-5-fluoro-(2'-methylcyclohexyl)phenyl]lactic acid (2 racemates)
β-[3-carboxy-5-chloro-(2'-methylcyclohexyl)phenyl]lactic acid (2racemates)
β-[3-chloro-5-trifluoromethyl-(4'-methylcyclohexyl)phenyl]lactic acid
β-[3-bromo-5-chloro-(4'-methylcyclohexyl)phenyl]lactic acid
β-[3-fluoro-5-trifluoromethyl-(4'-methylcyclohexyl)phenyl]lactic acid
β-[3,5-dichloro-(4'-methylcyclohexyl)phenyl]lactic acid
β-(3-nitro-4-cyclopentylphenyl)lactic acid
β-(3-nitro-4-cycloheptylphenyl)lactic acid
β-(3,5-dinitro-4-cyclohexylphenyl)lactic acid
β-(3,5-dinitro-4-cyclopentylphenyl)lactic acid
β-(3,5-dinitro-4-cycloheptylphenyl)lactic acid
β-(3-nitro-5-chloro-4-cyclohexylphenyl)lactic acid
β-(3-amino-5-nitro-4-cyclohexylphenyl)lactic acid
β-(3-dimethylamino-5-nitro-4-cyclohexylphenyl)lactic acid
β-(3-fluoro-5-nitro-4-cyclohexylphenyl)lactic acid
β-(3-hydroxy-5-nitro-4-cyclohexylphenyl)lactic acid
β-(3-methoxy-5-nitro-4-cyclohexylphenyl)lactic acid
β-(3-bromo-5-nitro-4-cyclohexylphenyl)lactic acid
β-(3-trifluoromethyl-5-nitro-4-cyclohexylphenyl)lactic acid
β-(3-iodo-5-nitro-4-cyclohexylphenyl)lactic acid
β-(3-mercapto-5-nitro-4-cyclohexylphenyl)lactic acid
β-(3-methylthio-5-nitro-4-cyclohexylphenyl)lactic acid
β-(3-methyl-5-nitro-4-cyclohexylphenyl)lactic acid
β-(3-carboxy-5-nitro-4-cyclohexylphenyl)lactic acid
β-(3,2'-dimethyl-5-nitro-4-cyclohexylphenyl)lactic acid
β-(3-methylsulfonly-5-nitro-4-cyclohexylphenyl)lactic acid
β-(3-amino-5-iodo-4-cyclohexylphenyl)lactic acid
β-(3-amino-5-methylsulfonyl-4-cyclohexylphenyl)lactic acid
β-(3-trifluoromethyl-5-methylsulfonyl-4-cyclohexylphenyl)lactic acid
β-(3-nitro-5-methylsulfinyl-4-cyclohexylphenyl)lactic acid
β-(3-bromo-5-methylsulfinyl-4-cyclohexylphenyl)lactic acid
β-(3-chloro-5-methylsulfinyl-4-cyclohexylphenyl)lactic acid
β-(3-methylsulfinyl-4-cyclohexylphenyl)lactic acid
β-(3-methylsulfonyl-4-cyclohexylphenyl)lactic acid
β-(3-iodo-4-cyclohexylphenyl)lactic acid
β-(3-mercapto-4-cyclohexylphenyl)lactic acid
β-(3-iodo-5-chloro-4-cyclohexylphenyl)lactic acid
β-(3-mercapto-5-chloro-4-cyclohexylphenyl)lactic acid
β(3-iodo-5-fluoro-4-cyclohexylphenyl)lactic acid
β-(3-mercapto-5-fluoro-4-cyclohexylphenyl)lactic acid
β-(3-iodio-5-bromo-4-cyclohexylphenyl)lactic acid
β-(3-iodo-5-acetyl-4-cyclohexylphenyl)lactic acid
β-(3-iodo-5-methylsulfonyl-4-cyclohexylphenyl)lactic acid
β-[3-nitro-4-(2'-methylcyclopentyl)phenyl]lactic acid (2racemates)
β-[3-nitro-4-(2'-methylcycloheptyl)phenyl]lactic acid (2racemates)
β-[3-nitro-4-(2'-methylcyclohexyl)phenyl]lactic acid (2 racemates)
β-[3-nitro-4-(3'-methylcyclohexyl)phenyl]lactic acid (2 racemates)
β-[3nitro-4-(4'-methylcyclohexyl)phenyl]lactic acid
β-[3-amino-5-nitro-4-(2'-methylcyclohexyl)phenyl]lactic acid (2 racemates)
β-[3-amino-5-nitro-4-(3'methylcyclohexyl)phenyl]lactic acid (2 racemates)
β-[3-amino-5-nitro-4-(4'-methylcyclohexyl)phenyl]lactic acid
β-[3,5-dinitro-4-(4'-methylcyclohexyl)phenyl]lactic acid
α-methyl-β-(3,2'-dimethyl-5-chloro-4-cyclohexylphenyl)lactic acid
α-methyl-β-(3,3'-dimethyl-5-chloro-4-cyclohexylphenyl)lactic acid
α-methyl-β-(3,4'-dimethyl-5-chloro-4-cyclohexylphenyl)lactic acid
α-methyl-β-[3-fluoro-4-(4'-methylcyclohexyl)phenyl]lactic acid
α-methyl-β-[3-nitro-4-(4'-methylcyclohexyl)phenyl]lactic acid
α-methyl-β-[3-bromo-4-(4'-methylcyclohexyl)phenyl]lactic acid
α-methyl-β-(3-chloro-4-cyclopentylphenyl)lactic acid
α-methyl-β-(3bromo-4-cyclopentylphenyl)lactic acid
α-methyl-β-(3-chloro-4-cycloheptylphenyl)lactic acid
α-methyl-β-(3-bromo-4-cycloheptylphenyl)lactic acid
α-methyl-β-(3-trifluoromethyl-4-cyclohexylphenyl)lactic acid
α-methyl-β-(3-amino-4-cyclohexylphenyl)lactic acid
α-methyl-β-(3-methylamino-4-cyclohexylphenyl)lactic acid
α-methyl-β-(3-dimethylamino-4-cyclohexylphenyl)lactic acid
α-methyl-β-(3-fluoro-4-cyclohexylphenyl)lactic acid α-methyl-β-(3-hydroxy-4-cyclohexylphenyl)lactic acid
α-methyl-β-(3-methoxy-4-cyclohexylphenyl)lactic acid
α-methyl-β-(3-bromo-4-cyclohexylphenyl)lactic acid
α-methyl-β-(3-acetyl-4-cyclohexylphenyl)lactic acid
α-methyl-β-(3,2'-dimethyl-4-cyclohexylphenyl)lactic acid
α-methyl-β-(3-methyl-4-cyclohexylphenyl)lactic acid
α-methyl-β-(3-amino-5-methyl-4-cyclohexylphenyl)lactic acid
α-methyl-β-(3-amino-5-fluoro-4-cyclohexylphenyl)lactic acid
α-methyl-β-(3-amino-5-chloro-4-cyclohexylphenyl)lactic acid
α-methyl-β-(3-amino-5-bromo-4-cyclohexylphenyl)lactic acid
α-methyl-β-(3-amino-5-trifluoromethyl-4-cyclohexylphenyl)lactic acid
α-methyl-β-(3-amino-5-cyano-4-cyclohexylphenyl)lactic acid
α-methyl-β-(3-methylamino-5-chloro-4-cyclohexylphenyl)lactic acid
α-methyl-β-(3-dimethylamino-5-chloro-4-cyclohexylphenyl)lactic acid
α-methyl-β-(3-fluoro-5-chloro-4-cyclohexylphenyl)lactic acid
α-methyl-β-(3-trifluoromethyl-5-chloro-4-cyclohexylphenyl)lactic acid
α-methyl-β-(3-hydroxy-5-chloro-4-cyclohexylphenyl)lactic acid
α--methyl-β-(3-methoxy-5-chloro-4-cyclohexylphenyl)lactic acid
α-methyl-β-(3-methyl-5-chloro-4-cyclohexylphenyl)lactic acid
α-methyl-β-(3-bromo-5-chloro-4-cyclohexylphenyl)lactic acid
α-methyl-β-(3-methyl-5-fluoro-4-cyclohexylphenyl)lactic acid
α-methyl-β-(3-methyl-5-bromo-4-cyclohexylphenyl)lactic acid
α-methyl-β-(3-methyl-5-trifluoromet-yl-1-4-cyclohexylphenyl)lactic acid
α-methyl-β-(3-acetyl-5-chloro-4-cyclohexylphenyl)lactic acid
α-methyl-β-(3-methyl-5-nitro-4-cyclohexylphenyl)lactic acid
α-methyl-β-(3,5-difluoro-4-cyclohexylphenyl)lactic acid
α-methyl-β-(3-bromo-5-fluoro-4-cyclohexylphenyl)lactic acid
α-methyl-β-(3-acetyl-5-fluoro-4-cyclohexylphenyl)lactic acid
α-methyl-β-(3,5-dibromo-4-cyclohexylphenyl)lactic acid
α-methyl-β-(3-acetyl-5-bromo-4-cyclohexylphenyl)lactic acid
α-methyl-β-(3-fluoro-5-trifluoromethyl-4-cyclohexylphenyl)lactic acid
α-methyl-β-(3-carboxy-5-trifluoromethyl-4-cyclohexylphenyl)lactic acid
α-methyl-β-(3-dimethylamino-5-trifluoromethyl-4-cyclohexylphenyl)lactic acid
α-methyl-β-(3-bromo-5-trifluoromethyl-4-cyclohexylphenyl)lactic acid
α-methyl-β-(3-hydroxy-5-trifluoromethyl-4-cyclohexylphenyl)lactic acid
α-methyl-β-(3-acetyl-5-trifluoromethyl-4-cyclohexylphenyl)lactic acid
α-methyl-β-(3,5-ditrifluoromethyl-4-cyclohexylphenyl)lactic acid
α-methyl-β-(3-acetyl-5-carboxy-4-cyclohexylphenyl)lactic acid
α-methyl-α-(3-chloro-4-cyclohexylphenyl)lactic acid
α-methyl-β-[3-chloro-4-(2'-methylcyclopentyl)phenyl]lactic acid (2 racemates)
α-methyl-β-[3-chloro-4-(2'-methylcyclohexyl)phenyl]lactic acid (2 racemates)
α-methyl-β-[3-chloro-4-(3-chloro-4-(2'-methylcycloheptyl)phenyl]lactic acid (2 racemates)
α-methyl-β-[3-chloro-4-(3'-methylcyclohexyl)phenyl]lactic acid (2 racemates)
α-methyl-β-[3-chloro-4-(4'-methylcyclohexyl)phenyl]lactic acid
α-methyl-β-[3-chloro-5-fluoro-(2'-methylcyclohexyl)phenyl]lactic acid (2 racemates)
α-methyl-β-[3-fluoro-5-bromo-(2'-methylcyclohexyl)phenyl]lactic acid (2 racemates)
α-methyl-β-[3-chloro-5-fluoro-(2'-methylcyclohexyl)phenyl]lactic acid (2 racemates)
α-methyl-β-[3-carboxy-5-chloro-(2'-methylcyclohexyl)phenyl]lactic acid (2 racemates)
α-methyl-β-[3-chloro-5-trifluoromethyl-(4'-methylcyclohexyl)phenyl]lactic acid
α-methyl-β-[3-bromo-5-chloro-(4'-methylcyclohexyl)phenyl)]lactic acid
α-methyl-β-[3-fluoro-5-trifluoromethyl-(4'-methylcyclohexyl)phenyl]lactic acid
α-methyl-β-[3,5-dichloro-(4'-methylcyclohexyl)phenyl]lactic acid
α-methyl-β-(3-nitro-4-cyclopentylphenyl)lactic acid
α-methyl-β-(3-nitro-4-cycloheptylphenyl)lactic acid
α-methyl-β-(3,5-dinitro-4-cyclohexylphenyl)lactic acid
α-methyl-β-(3,5-dinitro-4-cyclopentylphenyl)lactic acid
α-methyl-β-(3,5-dinitro-4-cycloheptylphenyl)lactic acid
α-methyl-β-(3-nitro-5-chloro-4-cyclohexylphenyl)lactic acid
α-methyl-β-(3-amino-5-nitro-4-cyclohexylphenyl)lactic acid
α-methyl-β-(3-dimethylamino-5-nitro-4-cyclohexylphenyl)lactic acid
α-methyl-β-(3-fluoro-5-nitro-4-cyclohexylphenyl)lactic acid
α-methyl-β-(3-hydroxy-5-nitro-4-cyclohexylphenyl)lactic acid
α-methyl-β-(3-methoxy-5-nitro-4-cyclohexylphenyl)lactic acid
α-methyl-β-(3-bromo-5-nitro-4-cyclohexylphenyl)lactic acid
α-methyl-β-(3-trifluoromethyl-5-nitro-4-cyclohexylphenyl)lactic acid
α-methyl-β-(3-iodo-5-nitro-4-cyclohexylphenyl)lactic acid
α-methyl-β-(3-mercapto-5nitro-4-cyclohexylphenyl)lactic acid
α-methyl-β-(3-methylthio-5-nitro-4-cyclohexylphenyl)lactic acid α-methyl-β-(3-methyl-5-nitro-4-cyclohexylphenyl)-
  lactic acid
α-methyl-β-(3-carboxy-5-nitro-4-cyclohexylphenyl)-
  lactic acid
α-methyl-β-(3,2'-dimethyl-5-nitro-4-cyclohexyl-
  phenyl)lactic acid
α-methyl-β-(3-methylsulfonyl-5-nitro-4-cyclohexyl-
  phenyl)lactic acid
α-methyl-β-(3-amino-5-iodo-4-cyclohexylphenyl)-
  lactic acid
α-methyl-β-(3-amino-5-methylsulfonyl-4-cyclohex-
  ylphenyl)lactic acid
α-methyl-β-(3-trifluoromethyl-5-methylsulfonyl-4-
  cyclohexylphenyl)lactic acid
α-methyl-β-(3-nitro-5-methylsulfinyl-4-cyclohexyl-
  phenyl)lactic acid
α-methyl-β-(3-bromo-5-methylsulfinyl-4-cyclohexyl-
  phenyl)lactic acid
α-methyl-β-(3-chloro-5-methylsulfinyl-4-cyclohexyl-
  phenyl)lactic acid
α-methyl-β-(3-methylsulfinyl-4-cyclohexylphenyl)-
  lactic acid
α-methyl-β-(3-methylsulfonyl-4-cyclohexylphenyl)-
  lactic acid
α-methyl-β-(3-iodo-4-cyclohexylphenyl)lactic acid
α-methyl-α-(3-mercapto-4-cyclohexylphenyl)lactic
  acid
α-methyl-β-(3-iodo-5-chloro-4-cyclohexylphenyl)-
  lactic acid
α-methyl-β-(3-mercapto-5-chloro-4-cyclohexyl-
  phenyl)lactic acid
α-methyl-β-(3-iodo-5-fluoro-4-cyclohexylphenyl)-
  lactic acid
α-methyl-β-(3-mercapto-5-fluoro-4-cyclohexyl-
  phenyl)lactic acid
α-methyl-β-(3-iodo-5-bromo-4-cyclohexylphenyl)-
  lactic acid
α-methyl-β-(3-iodo-5-acetyl-4-cyclohexylphenyl)-
  lactic acid
α-methyl-β-(3-iodo-5-methylsulfonyl-4-cyclohexyl-
  phenyl)lactic acid
α-methyl-β-[3-nitro-4-(2'-methylcyclopentyl)-
  phenyl]lactic acid (2 racemates)
α-methyl-β-[3-nitro-4-(2'-methylcycloheptyl)-
  phenyl]lactic acid (2 racemates)
α-methyl-β-[3-nitro-4-(2'-methylcyclohexyl)-
  phenyl]lactic acid (2 racemates)
α-methyl-β-[3-nitro-4-(3'methylcyclohexyl)phenyl]-
  lactic acid (2 racemates)
α-methyl-β-[3-nitro-4-(4'-methylcyclohexyl)-
  phenyl]lactic acid
α-methyl-β-[3-amino-5-nitro-4-(2'-methylcyclohex-
  yl)phenyl]lactic acid (2 racemates)
α-methyl-β-[3-amino-5-nitro-4-(3'-methylcyclohex-
  yl)phenyl]lactic acid (2 racemates)
α-methyl-β-[3-amino-5-nitro-4-(4'-methylcyclohex-
  yl)phenyl]lactic acid
α-methyl-β-[3,5dinitro-4-(4'-methylcyclohexyl)-
  phenyl]lactic acid

EXAMPLE 38

β-(3-Cyano-4-cyclohexylphenyl)lactic acid

A solution of 0.01 moles of benzyl β-(3-cyano-4-cyclohexylphenyl)-lactate dissolved in 100 ml. of acetic acid and containing 0.01 mole of hydrogen chloride is shaken with hydrogen over a 5% Pd carbon catalyst until 0.01 moles of hydrogen is absorbed. The catalyst is then filtered and the solution is evaporated to dryness and crystallized to obtain β-(3-cyano-4-cyclohexylphenyl)lactic acid.

When the benzyl ester used is
  benzyl β-(3-cyano-4-cyclohexylphenyl)lactate
  benzyl α-methyl-β-(3-cyano-4-cyclohexylphenyl)lac-
    tate
  benzyl β-(3-cyano-5-chloro-4-cyclohexylphenyl)lac-
    tate
  benzyl α-methyl-β-(3-cyano-5-chloro-4-cyclohexyl-
    phenyl)lactate
  benzyl β-(3-cyano-5-fluoro-4-cyclohexylphenyl)lac-
    tate
  benzyl β-(3-cyano-5-bromo-4-cyclohexylphenyl)lac-
    tate
  benzyl β-(3,5-dicyano-4-cyclohexylphenyl)lactate
  benzyl β-(3-cyano-5-nitro-4-cyclohexylphenyl)lac-
    tate
  benzyl β-(3-acetylamino-4-cyclohexylphenyl)lactate
  benzyl β-(3-acetylthio-4-cyclohexylphenyl)lactate
  benzyl β-(3-acetyloxy-4-cyclohexylphenyl)lactate
then the products obtained are
  β-(3-cyano-4-cyclohexylphenyl)lactic acid
  α-methyl-β-(3-cyano-4-cyclohexylphenyl)lactic acid
  β-(3-cyano-5-chloro-4-cyclohexylphenyl)lactic acid
  α-methyl-β-(3-cyano-5-chloro-4-cyclohexylphenyl)-
    lactic acid
  α-(3-cyano-5-fluoro-4-cyclohexylphenyl)lactic acid
  β-(3-cyano-5-bromo-4-cyclohexylphenyl)lactic acid
  β-(3,5-dicyano-4-cyclohexylphenyl)lactic acid
  β-(3-cyano-5-nitro-4-cyclohexylphenyl)lactic acid
  β-(3-acetylamino-4-cyclohexylphenyl)lactic acid
  β-(3-acetylthio-4-cyclohexylphenyl)lactic acid
  β-(3-acetyloxy-4-cyclohexylphenyl)lactic acid

EXAMPLE 39

β-(3-Chloro-4-cyclohexylphenyl)lactic acid

To a boiling solution of 29.4 g. (0.10 mole) of cinchonidine in 1 liter of absolute ethanol is added a boiling solution of 26.9 g. (0.10 mole) of dl β-(3-chloro-4-cyclohexylphenyl)lactic acid in 500 ml. of absolute ethanol. The solution is stirred briefly then allowed to cool to room temperature overnight. The precipitate is collected and washed with 2 × 25 ml. of ethanol and air dried. Recrystallization from isopropanol gives white needle crystals. This material is hydrolyzed with 200 ml. of 1.2 N-HCl. The white solid is collected, washed with 3 × 50 ml. water and dried at 55°C overnight. Recrystallization from benzene-cyclohexane 3:2 gives /β-(3-chloro-4-cyclohexylphenyl)lactic acid.

When modifications of the above resolution procedure is followed but dl β-(3-chloro-4-cyclohexylphenyl)lactic acid is replaced by an equimolar amount of the dl lactic acids of Examples 35 – 38, then the corresponding /-isomer is prepared.

EXAMPLE 40

β-(3-Chloro-4-cyclohexylphenyl)lactic acid

The combined ethanol and isopropanol filtrates from Example 39 are evaporated to dryness. This material is triturated with 1 liter of boiling acetone. The material which does not go into solution is filtered off. The filtrate is evaporated to dryness and hydrolyzed with 100 ml. of 1.2 N-HCl. The precipitate is collected, washed with 3 × 25 ml. of water, and dried at 55°C. Recrystallization from benzene-cyclohexane 3:2 gives d β-(3-chloro-4-cyclohexylphenyl)lactic acid.

When modifications of the above resolution procedure is followed but dl β-(3-chloro-4-cyclohexylphenyl)lactic acid is replaced by an equimolar amount of the dl lactic acids of Examples 35 – 38, then the corresponding d-isomer is prepared.

EXAMPLE 41

β-(3-Chloro-4-cyclohexylphenyl)lactic acid, sodium salt

A solution of 12.4 g of sodium bicarbonate in 135 ml. of water is added dropwise to a stirred solution of 46.3 g. (0.164 moles) of β-(3-chloro-4-cyclohexylphenyl)-lactic acid in 150 ml. of methanol. The solvent is removed in vacuo and the residue is dried by repeated distillations with anhydrous ethanol. The crystalline residue is triturated with ether (100 ml.), collected and washed with ether. The residue is dried in a vacuum desiccator to obtain β-(3-chloro-4-cyclohexylphenyl)-lactic acid, sodium salt.

When an equimolar amount of sodium bicarbonate in the above reaction is replaced by the compounds of Table I below, then the corresponding salt of Table II below is prepared.

Table I sodium hydroxide
potassium hydroxide
calcium hydroxide
potassium carbonate
magnesium bicarbonate

TABLE II

β-(3-chloro-4-cyclohexylphenyl)lactic acid, sodium salt

β-(3-chloro-4-cyclohexylphenyl)lactic acid, potassium salt

β-(3-chloro-4-cyclohexylphenyl)lactic acid, calcium salt

β-(3-chloro-4-cyclohexylphenyl)lactic acid, magnesium salt

When the dl, and l lactic acid compounds of this invention are used in the above reaction, then the corresponding salt is prepared.

EXAMPLE 42

β-(3-Chloro-4-cyclohexylphenyl)lactic acid, diethylammonium salt

Anhydrous diethylamine (0.11 moles) is added dropwise to a stirred solution of β-(3-chloro-4-cyclohexylphenyl)lactic acid (0.10 moles) in 100 ml. of n-hexane at 0°C. The precipitated diethylammonium salt is collected on a filter washed with n-hexane and dried in a vacuum desiccator to obtain β-(3-chloro-4-cyclohexylphenyl)lactic acid, diethylammonium salt.

When diethylamine in the above reaction is replaced by an equimolar amount of the compounds of Table I, below, then the corresponding product of Table II, below is prepared.

Table I

| dimethylamine | α-methylbenzylamine |
| β-hydroxyethylamine | cyclohexylamine |
| piperazine | triethylamine |
| piperidine | phenethylamine |

Table II

β-(3-chloro-4-cyclohexylphenyl)lactic acid, dimethylammonium salt

β-(3-chloro-4-cyclohexylphenyl)lactic acid, β-hydroxyethylammonium salt

β-(3-chloro-4cyclohexylphenyl)lactic acid, piperazinium salt

β-(3-chloro-4-cyclohexylphenyl)lactic acid, piperidinium salt

β-(3-chloro-4-cyclohexylphenyl)lactic acid, α-methylbenzylammonium salt

β-(3-chloro-4-cyclohexylphenyl)lactic acid, cyclohexylammonium salt

β-(3-chloro-4-cyclohexylphenyl)lactic acid, triethylammonium salt

β-(3-chloro-4-cyclohexylphenyl)lactic acid, phenethylammonium salt

When the dl, and l lactic acids of this invention are used in the above reaction, then the corresponding salt is prepared.

EXAMPLE 43

N-isopropyl-β-(3-chloro-4-cyclohexylphenyl)lactamide

Ethyl β-(3-chloro-4-cyclohexylphenyl)lactate 31 g. (0.1 mole) is stirred with 20 ml. of isopropylamine at about 35°C with stirring overnight and the temperature is then raised to reflux for 28 hours. The reaction mixture is evaporated in vacuo and the residue distilled to obtain N-isopropyl-β-(3-chloro-4-cyclohexylphenyl)-lactamide.

When isopropylamine in the above reaction is replaced by an equimolar amount of the compound of Table I, below, then the corresponding product of Table II below is prepared.

Table I

| dimethylamine | isothiazolidine |
| ethylmethylamine | piperidine |
| t-butylamine | morpholine |
| cyclopropylamine | N-methylpiperazine |
| | N-methylhomopiperazine |

Table II

N,N-diethyl-β-(3-chloro-4-cyclohexylphenyl)lactamide

N-met-yl-N-ethyl-β-(3-chloro-4-cyclohexylphenyl)-lactamide

N-t-butyl-β-(3-chloro-4-cyclohexylphenyl)lactamide

N-cyclopropyl-β-(3-chloro-4-cyclohexylphenyl)lactamide

N,N-pentamethylene-β-(3-chloro-4-cyclohexylphenyl)lactamide

N,N,-oxydiethylene-β-(3-chloro-4-cyclohexylphenyl)lactamide

N,N-methylaminodiethylene-β-(3-chloro-4-cyclohexylphenyl)lactamide

N,N-methylaminoethylenetrimethylene-β-(3-chloro-4-cyclohexylphenyl)lactamide

N,N-thiotrimethylene-β-(3-chloro-4-cyclohexylphenyl)lactamide

When isopropylamine in the above reaction is replaced by ammonia, methylamine or dimethylamine and the reaction carried out in a bomb at 150°C, then the product prepared is β-(3-chloro-4-cyclohexylphenyl)lactamide, N-methyl-β-(3-chloro-4-cyclohexyl-phenyl)lactamide or N,N-dimethyl-β-(3-chloro-4-cyclohexylphenyl)lactamide.

When the dl, or l lactic acids of this invention are used in the above reaction, then the corresponding amide is prepared.

I claim:

1. A β-(3-chloro-4-cyclohexylphenyl)-α-benzoyloxy propionic acid compound of the formula

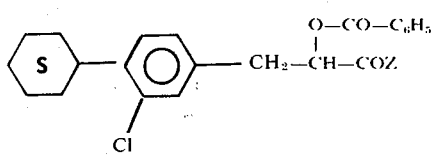

in which
Z is hydroxyl,
lower alkoxy,
phenyl lower alkoxy, or
the group —OM in which M is an alkali metal, alkaline earth metal, aluminum, ammonium, or di-lower alkyl ammonium.

2. β-(3-chloro-4-cyclohexylphenyl)α-benzoyloxy propionic acid of the formula

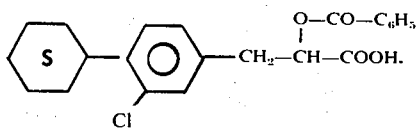

* * * * *